(12) United States Patent
Geng et al.

(10) Patent No.: US 12,483,967 B2
(45) Date of Patent: Nov. 25, 2025

(54) DATA TRANSMISSION METHOD AND COMMUNICATION APPARATUS

(71) Applicant: HUAWEI TECHNOLOGIES CO., LTD., Shenzhen (CN)

(72) Inventors: Tingting Geng, Shanghai (CN); Qinghai Zeng, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 499 days.

(21) Appl. No.: 17/967,561

(22) Filed: Oct. 17, 2022

(65) Prior Publication Data
US 2023/0031092 A1 Feb. 2, 2023

Related U.S. Application Data

(63) Continuation of application No. PCT/CN2021/085797, filed on Apr. 7, 2021.

(30) Foreign Application Priority Data

Apr. 16, 2020 (CN) .......................... 202010300231.X

(51) Int. Cl.
*H04W 40/24* (2009.01)

(52) U.S. Cl.
CPC ................... *H04W 40/248* (2013.01)

(58) Field of Classification Search
CPC .................. H04W 40/248; H04W 40/24
See application file for complete search history.

(56) References Cited

U.S. PATENT DOCUMENTS

| 2018/0192471 A1* | 7/2018 | Li ........................ H04W 72/53 |
| 2019/0165964 A1* | 5/2019 | Bartier ................... H04L 45/48 |
| 2020/0296653 A1* | 9/2020 | Huang .................. H04W 40/00 |
| 2022/0256434 A1* | 8/2022 | Wang .................... H04W 4/023 |

FOREIGN PATENT DOCUMENTS

| CN | 107318141 A | 11/2017 |
| CN | 109842956 A | 6/2019 |
| CN | 109996306 A | 7/2019 |
| EP | 3589039 A1 | 1/2020 |
| WO | 2019128947 A1 | 7/2019 |

* cited by examiner

*Primary Examiner* — Kent Krueger
(74) *Attorney, Agent, or Firm* — Leydig, Voit & Mayer, Ltd.

(57) ABSTRACT

This application discloses a data transmission method and a communication apparatus. The data transmission method includes: The access network device receives a first data packet from a first terminal device, where the first data packet is associated with a terminal group, the terminal group including the first terminal device. The access network device sends the first data packet to a first routing device for forwarding. The first routing device corresponds to the terminal group. The first routing device stores routing information of one or more respective terminal devices of the terminal group. The routing information is for forwarding the first data packet. Signaling overheads can be reduced by using embodiments of this application.

28 Claims, 7 Drawing Sheets

DATA TRANSMISSION METHOD AND COMMUNICATION APPARATUS

CROSS-REFERENCE TO RELATED APPLICATIONS

This application is a continuation of International Application No. PCT/CN2021/085797, filed on Apr. 7, 2021, which claims priority to Chinese Patent Application No. 202010300231.X, filed on Apr. 16, 2020. The disclosures of the aforementioned applications are hereby incorporated by reference in their entireties.

TECHNICAL FIELD

This application relates to the field of communication technologies, and in particular, to a data transmission method and a communication apparatus.

BACKGROUND

In a conventional data transmission architecture, after a terminal device accesses a base station, a session management function (SMF) selects a user plane function (UPF) for the terminal device, and establish a fixed channel between the terminal device and a data network (DN). The fixed channel passes through the base station and the selected UPF. The terminal device communicates with the DN through the fixed channel. Over the fixed channel, a channel between the base station and the UPF may be a general packet radio service tunneling protocol (GTP) channel. Currently, a channel between UE and the UPF is managed based on a terminal device. As the terminal device moves, a channel between the terminal device and the UPF is continuously created or released, resulting in high signaling overheads.

SUMMARY

Embodiments of this application provide a data transmission method and a communication apparatus, to avoid frequent creation or release of channels between a terminal device and a routing device, reducing signaling overheads.

According to a first aspect, an embodiment of this application provides a data transmission method. The method may be performed by an access network device, or may be performed by a component (for example, a processor, a chip, or a chip system) of the access network device. The data transmission method may include: The access network device receives a first data packet from a first terminal device, where the first data packet is associated with a terminal group. Optionally, the first data packet may include a group identifier of the terminal group, and the group identifier can uniquely indicate a terminal group. For example, the group identifier may include but is not limited to at least one of the following: an IP multicast address, a MAC multicast address, a terminal group identity (ID), or the like of the terminal group. The terminal group may include at least one terminal device, and the first terminal device belongs to the terminal group. Further optionally, the first data packet may be sent to one or more terminal devices belonging to the terminal group.

The access network device sends the first data packet to a first routing device for forwarding, where the first routing device corresponds to the terminal group. The first routing device stores routing information of one or more of the at least one terminal device in the terminal group. The routing information is for forwarding a data packet associated with the terminal group, where the data packet associated with the terminal group includes the first data packet.

For example, the first routing device may correspond to one or more terminal groups. If the first routing device corresponds to a plurality of terminal groups, the first routing device stores routing information of each terminal device included in each of the plurality of terminal groups.

Correspondingly, the first routing device receives the first data packet from the access network device, and forwards the first data packet based on information about the first data packet and the stored routing information.

In this embodiment of this application, determining, based on the terminal group associated with the data packet, a routing device for forwarding the data packet means that a data transmission channel between the access network device and the routing device is managed based on the terminal group. All data packets that are associated with the terminal group and that are received by the access network device may be transmitted through a group transmission channel corresponding to the terminal group. This can avoid, in the case of managing the data transmission channel between the access network device and the routing device based on the terminal device, high signaling overheads caused by frequent creation or release of data transmission channels as the terminal device moves. Therefore, in this application, the data packet is forwarded based on the terminal group, reducing signaling overheads.

Optionally, the first routing device may store routing information of some terminal devices in the terminal group. For example, the first routing device stores routing information of one or more terminal devices that belong to the terminal group and that are in one or more cells managed by one or more access network devices connected to the first routing device. In this scenario, the first terminal device may send data to the one or more terminal devices that belong to the terminal group and that are in the one or more cells managed by the one or more access network devices.

Alternatively, the first routing device may store routing information of all terminal devices in the terminal group. For example, the first routing device may synchronize with at least one second routing device, to obtain the routing information of all the terminal devices in the terminal group. Alternatively, the first routing device obtains a set of routing information from a routing information centralized management device, to obtain the routing information of all the terminal devices in the terminal group. For details, refer to descriptions in subsequent embodiments. Details are not described herein. In this scenario, the first terminal device may send data to all the terminal devices belonging to the terminal group.

In a possible design, the first routing device may be a logical node. The first routing device may be configured in the access network device, or the first routing device may be configured in a core network device. For example, the first routing device may be configured in a user plane function (UPF).

Alternatively, the first routing device may be an entity device. The entity device may be configured in an access network, or may be configured in a core network.

The first routing device may be connected to one or more access network devices. When receiving the data packet associated with the terminal group, the one or more access network devices may send the data packet to the first routing device for forwarding.

According to this embodiment, a function of a routing device is added on the basis of ensuring a function of an original device, to improve device compatibility and reduce deployment costs.

In a possible design, the first data packet may include the group identifier of the terminal group, that is, directly indicate the group identifier, so that a step of determining the terminal group associated with the data packet can be simplified.

In a possible design, the terminal group may be determined based on service types. In this implementation, a same terminal device may belong to one or more terminal groups. For example, the first terminal device may send service data of a service type A and may send service data of a service type B. In this case, the terminal device may belong to a terminal group corresponding to the service type A and a terminal group corresponding to the service type B. For descriptions of the service type, refer to descriptions in subsequent embodiments. Details are not described herein.

According to this embodiment, data packets of a same service type are forwarded by a same routing device, so that data transmission reliability can be improved.

It may be understood that terminal groups may alternatively be determined based on network slices, service requirements, geographical areas in which terminal devices are located, and the like. For details, refer to descriptions in subsequent embodiments. Details are not described herein.

In a possible design, the access network device may send, through a group transmission channel established between the access network device and the first routing device, the first data packet to the first routing device for forwarding, where the group transmission channel is for transmitting a data packet associated with the terminal group.

According to this embodiment, the group transmission channel between the access network device and the first routing device is managed based on the terminal group, so that frequent creation or release of data transmission channels can be avoided, and signaling overheads can be reduced.

In a possible design, the data transmission method in this embodiment of this application further includes: The access network device receives a service request from a second terminal device, where the service request indicates that the second terminal device prepares to send, to the access network device, a data packet associated with the terminal group, and the second terminal device belongs to the terminal group. Optionally, the second terminal device may be the same as or different from the first terminal device.

Optionally, the service request may directly or indirectly indicate the terminal group. For example, the service request includes the group identifier of the terminal group, to directly indicate that the second terminal device prepares to send the data packet associated with the terminal group. Alternatively, in a passive call scenario, the access network device receives a paging request, where the paging request includes identification information of the to-be-paged second terminal device and/or a service type of service data sent by the second terminal device. When receiving the service request from the second terminal device, the access network device may indirectly determine, based on the pre-received paging request, a terminal group to which the second terminal device belongs.

The access network device determines the first routing device corresponding to the terminal group based on the service request, where a transmission parameter of a group transmission channel corresponding to the terminal group is preconfigured for the first routing device. The access network device further determines whether the group transmission channel corresponding to the terminal group is activated, and activates the group transmission channel if the group transmission channel corresponding to the terminal group has not been activated. If the access network device determines that the group transmission channel corresponding to the terminal group has been activated, the group transmission channel may not be repeatedly activated.

After the group transmission channel corresponding to the terminal group is activated, the data packet associated with the terminal group may be transmitted through the group transmission channel.

According to this embodiment, the transmission parameter of the group transmission channel corresponding to the terminal group is preconfigured in the first routing device. When the data packet associated with the terminal group is to be transmitted through the group transmission channel, the group transmission channel is activated without a need of temporarily configuring a transmission parameter of the group transmission channel, thereby improving transmission efficiency of the data packet.

In a possible design, the data transmission method in this embodiment of this application further includes: The access network device receives a service request from a second terminal device, where the service request indicates that the second terminal device prepares to send, to the access network device, a data packet associated with the terminal group, and the second terminal device belongs to the terminal group. Optionally, the second terminal device may be the same as or different from the first terminal device.

Optionally, the service request may directly or indirectly indicate the terminal group. For example, the service request includes the group identifier of the terminal group, to directly indicate that the second terminal device prepares to send the data packet associated with the terminal group. Alternatively, in a passive call scenario, the access network device receives a paging request, where the paging request includes identification information of the to-be-paged second terminal device and/or a service type of service data sent by the second terminal device. When receiving the service request from the second terminal device, the access network device may indirectly determine, based on the pre-received paging request, a terminal group to which the second terminal device belongs.

The access network device determines, based on the service request, whether a group transmission channel corresponding to the terminal group has been created. If the group transmission channel corresponding to the terminal group has not been created, the access network device temporarily creates a group transmission channel corresponding to the terminal group. For example, the access network device selects the first routing device, and configures, in the first routing device, a transmission parameter of the group transmission channel corresponding to the terminal group. The first routing device may be a routing device selected from a plurality of routing devices.

According to this embodiment, when the service request is received, the group transmission channel corresponding to the terminal group is temporarily created. In other words, in this embodiment, the group transmission channel may be created as required, thereby improving flexibility of creating a transmission channel and improving resource utilization.

In a possible design, the service request may further include identification information of the second terminal device. The identification information can uniquely determine the terminal device, or uniquely determine the terminal device in the terminal group. For the identification information of the terminal device, refer to descriptions in subsequent embodiments. Details are not described herein.

The access network device may further send a first routing information update request to the first routing device based on the identification information of the second terminal device in the service request, where the first routing information update request may include the identification information of the second terminal device, so that the first routing device adds routing information of the second terminal device to routing information stored in the first routing device, and the first routing device may learn of the identification information of the terminal device that belongs to the terminal group and that is managed by the first routing device.

For example, the routing information of the second terminal device may include one or more of the following information: identification information of the first routing device, the identification information of the second terminal device, and identification information of the access network device.

In a possible design, as the first terminal device moves, the first terminal device may move out of a cell managed by the access network device. When detecting that the first terminal device moves out of the cell managed by the access network device, the access network device may further determine whether the cell managed by the access network device further includes a terminal device belonging to the terminal group. It may be determined, in the cell managed by the access network device, whether a terminal device in a connected mode or an inactive mode includes the terminal device belonging to the terminal group.

If it is determined that the cell managed by the access network device does not include the terminal device belonging to the terminal group, the access network device may deactivate the group transmission channel corresponding to the terminal group.

It may be understood that, before the data packet associated with the terminal group is transmitted through the group transmission channel, the access network device activates the group transmission channel. Correspondingly, if the cell managed by the access network device does not include the terminal device belonging to the terminal group, the group transmission channel corresponding to the terminal group is deactivated.

According to this embodiment, when it is detected that the cell managed by the access network device does not include the terminal device belonging to the terminal group, deactivating the group transmission channel corresponding to the terminal group can save energy.

In a possible design, if it is detected that the first terminal device moves out of the cell managed by the access network device, and it is determined that the cell managed by the access network device does not include the terminal device belonging to the terminal group, the access network device releases the group transmission channel corresponding to the terminal group. For descriptions of releasing the group transmission channel, refer to descriptions in subsequent embodiments. Details are not described herein.

It may be understood that, before the data packet associated with the terminal group is transmitted through the group transmission channel, the access network device creates the group transmission channel. Correspondingly, if the cell managed by the access network device does not include the terminal device belonging to the terminal group, the group transmission channel corresponding to the terminal group is released.

According to this embodiment, when it is detected that the cell managed by the access network device does not include the terminal device belonging to the terminal group, the group transmission channel corresponding to the terminal group is released, so that resources can be reserved to establish another group transmission channel, to improve resource utilization.

In a possible design, if it is detected that the first terminal device moves out of the cell managed by the access network device, and it is determined that the cell managed by the access network device further includes the terminal device belonging to the terminal group, the group transmission channel corresponding to the terminal group is not deactivated or released. The access network device sends a second routing information update request to the first routing device, where the second routing information update request requests to delete routing information of the first terminal device from the first routing device.

According to this embodiment, although the first terminal device moves out of the cell managed by the access network device, the cell managed by the access network device further includes the terminal device belonging to the terminal group, so that the group transmission channel corresponding to the terminal group is not deactivated or released. Therefore, frequent creation or release of data transmission channels due to movement of the terminal device can be avoided, and signaling overheads can be reduced.

According to a second aspect, an embodiment of this application provides a data transmission method. The method may be performed by a first routing device, or may be performed by a component (for example, a processor, a chip, or a chip system) of the first routing device. The data transmission method may include: A first routing device receives a first data packet from an access network device, where the first data packet is associated with a terminal group, and the first routing device corresponds to the terminal group. The terminal group may include at least one terminal device, and the first routing device is configured to forward a data packet associated with the terminal group, where the data packet associated with the terminal group includes the first data packet.

The first routing device forwards the first data packet based on routing information of one or more of the at least one terminal device belonging to the terminal group.

According to this embodiment of this application, the received data packet is forwarded based on the terminal group, so that frequent creation or release of data transmission channels between the first routing device and the access network device can be avoided, and signaling overheads can be reduced.

Optionally, the first routing device may determine, based on information in the first data packet, a terminal device for receiving the first data packet, and forward the first data packet based on routing information of one or more terminal devices in the terminal group.

For example, if the first data packet includes identification information of a third terminal device, it may be determined that the terminal device for receiving the first data packet is the third terminal device, and the first routing device forwards the first data packet based on routing information of the third terminal device.

For example, if the first data packet includes a target service area identifier or target service area information, it may be determined that the terminal device for receiving the first data packet is a terminal device that is in the target service area and that belongs to the terminal group. The first routing device forwards, based on routing information of one or more terminal devices that belong to the terminal group and that are in the target service area, the first data packet to the terminal device that belongs to the terminal group and that is in the target service area.

For example, if the first data packet includes a group identifier of the terminal group but does not indicate information about another terminal device for receiving the first data packet, it may be determined that the terminal device receiving the first data packet is of all terminal devices belonging to the terminal group. The first routing device forwards, based on routing information of all the terminal devices belonging to the terminal device group, the first data packet to all the terminal devices belonging to the terminal group.

In a possible design, routing information stored in the first routing device may be obtained through synchronization by the first routing device with at least one second routing device, or the routing information may be obtained by the first routing device from a routing information centralized management device, where the routing information centralized management device is configured to manage routing information stored in the first routing device and the at least one second routing device.

Optionally, the second routing device may also correspond to the terminal group. The second routing device and the first routing device may be connected to different access network devices, and manage different terminal devices belonging to the terminal group. It may be understood that different second routing devices may alternatively be connected to different access network devices, and manage different terminal devices belonging to the terminal group.

According to this embodiment, the first routing device may obtain, via synchronization or the routing information centralized management device, the routing information of all the terminal devices belonging to the terminal group, to forward the data packet associated with the terminal group.

According to a third aspect, an embodiment of this application provides a communication apparatus, including units or modules configured to perform the method according to the first aspect or the second aspect.

According to a fourth aspect, an embodiment of this application provides a communication apparatus, including a processor. The processor is coupled to a memory, and may be configured to execute instructions in the memory, to implement the method according to the first aspect or the second aspect. Optionally, the communication apparatus further includes a memory. Optionally, the communication apparatus further includes a communication interface coupled to the processor.

According to a fifth aspect, an embodiment of this application provides a processor, including an input circuit, an output circuit, and a processing circuit. The processing circuit is configured to receive a signal through the input circuit, and transmit a signal through the output circuit, so that the processor performs the method according to the first aspect or the second aspect.

In a specific implementation process, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to a sixth aspect, an embodiment of this application provides a processing apparatus, including a processor and a memory. The processor is configured to read instructions stored in the memory, receive a signal by using a receiver, and transmit a signal by using a transmitter, to perform the method according to the first aspect or the second aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be separately disposed in different chips. A type of the memory and a manner in which the memory and the processor are disposed are not limited in this embodiment of this application.

It should be understood that a related data exchange process, for example, sending a service request, may be a process of outputting the service request from the processor, and receiving a message may be a process of receiving the message by the processor. Specifically, data output by the processor may be output to the transmitter, and input data received by the processor may be from the receiver. The transmitter and the receiver may be collectively referred to as a transceiver.

The processing apparatus in the sixth aspect may be one or more chips. The processor in the processing apparatus may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

According to a seventh aspect, an embodiment of this application provides a computer program product. The computer program product includes a computer program (which may also be referred to as code or instructions). When the computer program is run, a computer is enabled to perform the method according to the first aspect or the second aspect.

According to an eighth aspect, an embodiment of this application provides a readable storage medium. The readable storage medium stores a computer program (which may also be referred to as code or instructions). When the computer program is run on a computer, the method according to the first aspect or the second aspect is implemented.

According to a ninth aspect, an embodiment of this application provides a communication system, including the access network device and/or the first routing device.

Optionally, the communication system may further include a terminal device.

According to a tenth aspect, a chip system is provided. The chip system includes a processor and an interface circuit. The processor is configured to invoke, from a memory, a computer program (which may also be referred to as code or instructions) stored in the memory and run the computer program, to implement functions in the first aspect or the second aspect. In a possible design, the chip system further includes the memory, and the memory is configured to store program instructions and data. The chip system may include a chip, or may include a chip and another discrete component.

DESCRIPTION OF EMBODIMENTS

Technical solutions in embodiments of this application may be applied to various communication systems, for example, a long term evolution (LTE) system, a universal mobile telecommunications system (UMTS), a 5th generation (5G) system, a new radio (NR) system, and another new system emerging with development of technologies. Embodiments of this application may be further applied to the Internet of Vehicles, for example, scenarios such as V2X communication, long term evolution-vehicle (LTE-V), and vehicle to vehicle (V2V) communication.

Figure 1:
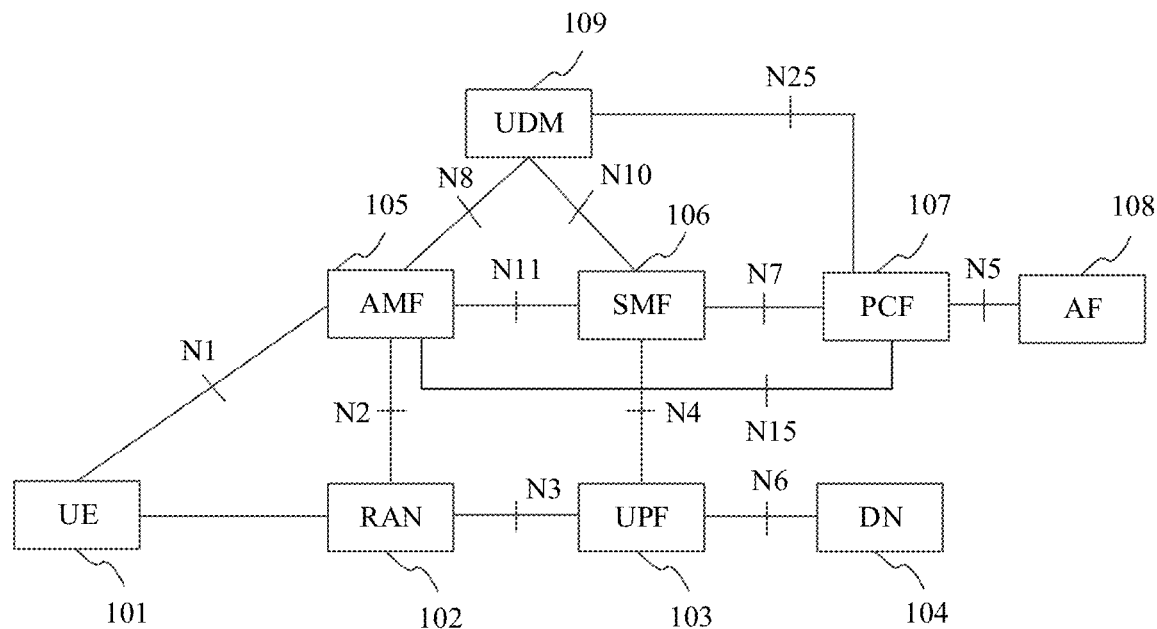
FIG. 1 is a diagram of a system architecture according to an embodiment of this application.

FIG. 1 is a schematic diagram of a 5G system that may be used in this application. As shown in FIG. 1, the system may include two parts: an access network and a core network. The access network is configured to implement functions related to radio access, and mainly includes a radio access network (RAN) device 102. The core network mainly includes the following several key logical network elements: a user plane function (UPF) 103, an access and mobility management function (AMF) 105, a session management function (SMF) 106, a policy control function (PCF) 107, and a unified data management (UDM) function 109. The system 100 may further include user equipment (UE) 101, a data network (DN) 104, and an application function (AF) 108. Interfaces between the network elements are shown in FIG. 1. It should be understood that the network elements may alternatively communicate with each other through a service-oriented interface. A network element deployed in a core network may be referred to as a core network device. A device deployed in an access network may be referred to as an access network device.

The UE may also be referred to as a terminal device. The terminal device may communicate with one or more core networks (CNs) via a RAN device. The terminal device may be referred to as an access terminal, a terminal, a subscriber unit, a subscriber station, a mobile station, a remote station, a remote terminal, a mobile device, a user terminal, a wireless network device, a user agent, or a user apparatus. The terminal may be a cellular phone, a cordless phone, a session initiation protocol (SIP) phone, a wireless local loop (WLL) station, a personal digital assistant (PDA), a handheld device having a wireless communication function, a computing device, another device connected to a wireless modem, a vehicle-mounted device, a wearable device, a terminal device in an internet of things, a terminal device in an internet of vehicles, a terminal device in any form in a future network, or the like. The terminal device may be a virtual reality (VR) terminal device having the wireless transceiver function, an augmented reality (AR) terminal device, a wireless terminal device in industrial control, a wireless terminal device in self-driving, a wireless terminal device in remote medicine (remote medicine), a wireless terminal device in a smart grid, a wireless terminal device in transportation safety, a wireless device terminal in a smart city, or a wireless terminal device in a smart home. The terminal device may be deployed on land, including an indoor or outdoor device, a handheld device, or a vehicle-mounted device; or may be deployed on water (for example, on a ship); or may be deployed in the air (for example, on an airplane, a balloon, or a satellite).

The RAN device is a device that connects a terminal device to a wireless network, and may be specifically a base station. There may be various forms of base stations, for example, a macro base station, a micro base station (also referred to as a small cell), a relay station, and an access point. The base station may be specifically an access point (AP) in a wireless local area network (WLAN), a base transceiver station (BTS) in a global system for mobile communications (GSM) or code division multiple access (CDMA), a NodeB (NB) in wideband code division multiple access (WCDMA), an evolved NodeB (eNB or eNodeB), a relay station, an access point, a vehicle-mounted device, or a wearable device in LTE, a next generation NodeB (gNB) in a 5G system, a base station in a future evolved public land mobile network (PLMN), or the like.

In a network structure, the RAN device may include a centralized unit (CU) node or a distributed unit (DU) node, or include the CU node and the DU node. In a network structure, the centralized unit CU node may be divided into a control plane (CU-CP) and a user plane (CU-UP). The CU-CP is responsible for a control plane function, and mainly includes radio resource control (RRC) and a packet data convergence protocol (PDCP)-C. The PDCP-C is mainly responsible for data encryption and decryption, integrity protection, data transmission, and the like on a control plane. The CU-UP is responsible for user plane functions, and mainly includes a service data adaptation protocol (SDAP) layer and a PDCP-U. The SDAP is mainly responsible for processing data of a core network and mapping a data flow (flow) to a bearer. The PDCP-U is mainly responsible for encryption and decryption, integrity protection, header compression, serial number maintenance, data transmission, and the like on a data plane. The CU-CP and the CU-UP are connected through an E1 interface. The CU-CP indicates that the CU is connected to the core network through an Ng interface. The CU-CP is connected to the DU through F1-C (the control plane). The CU-UP is connected to the DU through F1-U (the user plane). Certainly, in another possible implementation, the PDCP-C is also in the CU-UP.

The UDM has functions such as user subscription data management and generation of user authentication information.

The AMF is mainly responsible for functions such as UE registration management, UE connection management, UE reachability management, UE access authorization and access authentication, UE security functionality, UE mobility management, network slice selection, and SMF selection. The AMF serves as an anchor of an N1/N2 interface signaling connection, provides the SMF with routing of an N1/N2 interface session management (SM) message, and maintains and manages state information of the UE.

The SMF is mainly responsible for all control plane functions in session management of the UE. The control plane functions include UPF selection and control, internet protocol (IP) address assignment and management, quality of service (QoS) management of a session, and obtaining of a policy and charging control (PCC) policy from the PCF. The SMF also serves as a termination of an SM part in a non-access stratum (NAS) message.

The PCF has functions, for example, providing policy rules to control plane functional entities.

The AF may be an application server that may belong to an operator or a third party.

The UPF is mainly responsible for processing a user packet, for example, forwarding and charging. The UPF may serve as an anchor of a protocol data unit (PDU) session connection, namely, a PDU session anchor (PSA), and is responsible for data packet filtering, data transmission/forwarding, rate control, charging information generation, QoS handling for user plane, uplink transmission authentication, transmission class verification, downlink data packet buffering, downlink data notification triggering, and the like of the UE. The UPF may also serve as a branching point of a multi-homed PDU session.

The DN is a network that provides the user with a data transmission service, for example, an IP multimedia service (IMS) or the Internet. The DN may include the application server (AS). The AS is a software framework, provides an environment in which an application program is run, and is configured to provide the application program with services such as security, data, transaction support, load balancing, and large-scale distributed system management. The UE communicates with the AS to obtain an application packet. It should be noted that the AF is a control plane of the AS.

It should be understood that embodiments of this application are not limited to being applied to the system architecture shown in FIG. 1. For example, a communication system to which the data transmission method in embodiments of this application may be applied may include more or fewer network elements or devices. For example, a routing device in embodiments of this application is deployed in a network as a network element. The system architecture shown in FIG. 1 may further include a routing device. For example, the routing device may be connected to both the RAN device and the UPF. The devices or the network elements in FIG. 1 may be hardware, or may be software obtained through functional division or a combination of the hardware and the software. The devices or the network elements in FIG. 1 may communicate with each other via another device or network element.

Before the method in this application is described in detail, some concepts in this application are first briefly described.

The routing device in embodiments of this application may be referred to as a switch function group (SFG), or may be referred to as a forwarding device, or the like. This is not limited in embodiments of this application.

The routing device in embodiments of this application may be configured in a network as a new network element, or may be a functional module on an existing network element or device in the network, for example, may be a logical node on an existing network element or device. It may be understood that if the routing device is a functional module on the network element, the functional module may include software and/or hardware configured to implement functions of the routing device in embodiments of this application. Alternatively, the routing device in embodiments of this application may be an existing network element or device deployed in a network. The network element or device can implement functions of the routing device in embodiments of this application. For example, the routing device in embodiments of this application may be an access network device, a UPF network element, or the like. It may be understood that the network element in embodiments of this application may be a logical node or a physical entity, and the physical entity may be an entity device such as a base station.

By way of example, and not limitation, the routing device may be configured in the following manners.

In a first optional manner, the routing device may be deployed in an access network.

Figure 2:
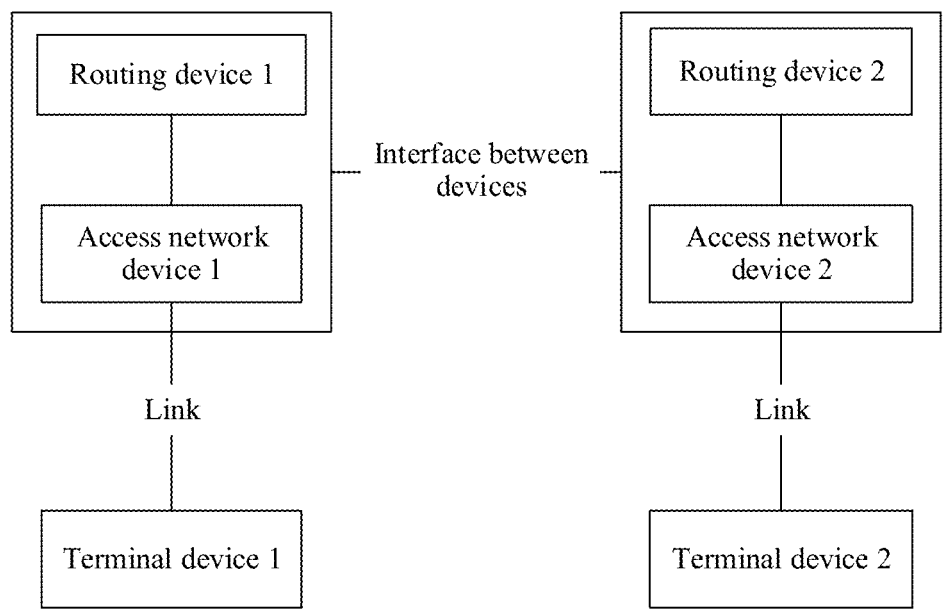
FIG. 2 is a schematic diagram of routing device deployment according to an embodiment of this application.

Optionally, the routing device in embodiments of this application may be configured in the access network as an entity device. The routing device is different from the access network device. For example, the access network includes the access network device and the routing device. As shown in FIG. 2, a routing device is configured in an access network. A terminal device 1 is connected to an access network device 1 over a wired link or a wireless link, and the access network device 1 is connected to a routing device 1. A terminal device 2 is connected to an access network device 2 over a wired link or a wireless link, and the access network device 2 is connected to a routing device 2. It may be understood that one routing device may be connected to one or more access network devices, or one access network device may be connected to one or more routing devices. In FIG. 2, an example in which one access network device is connected to one routing device is used for description.

Alternatively, the routing device in embodiments of this application may be a functional module in the access network device, and the functional module can implement functions of the routing device provided in embodiments of this application. In this manner, the access network device not only has a function of connecting a terminal device to a wireless network, but also has the functions of the routing device provided in embodiments of this application.

In a second optional manner, the routing device may be deployed in a core network.

Optionally, the routing device in embodiments of this application may be configured in the core network as a new network element. The routing device is different from another network element in the core network. For example, the routing device may be deployed between the access network device and the UPF, and is connected to both the access network device and the UPF. It may be understood that one routing device may be connected to one or more access network devices, or one access network device may be connected to one or more routing devices.

Alternatively, the routing device in embodiments of this application may be a functional module in the core network device, and the functional module can implement functions of the routing device provided in embodiments of this application, for example, the routing device may be a functional module in the UPF.

In a third optional manner, the routing device may be independently deployed, and the routing device may belong to neither an access network nor a core network.

The routing device may be communicatively connected to the access network device and/or the core network device, for example, connected in a wired manner or a wireless manner. The routing device communicates with a terminal device via the access network device or the core network device.

It should be understood that the listed configuration manners of the routing device are merely examples for description. This application is not limited thereto. A specific configuration form of the routing device may be randomly changed on the basis of implementing functions of the routing device in this application. For example, the routing device may alternatively be configured in a gateway device, a router, or another device. This is not limited in embodiments of this application.

Optionally, a plurality of routing devices may be configured in a network, and different routing devices may be communicatively connected, for example, connected in a wired manner or in a wireless manner. Similarly, the routing device in embodiments of this application may be connected to the access network device in a wired or wireless manner. In some optional manners, the routing device may alternatively be indirectly connected to the access network device, for example, indirectly connected to the access network device via the core network device.

In embodiments of this application, at least one terminal device with same or similar features may be grouped into a same terminal group. The features may include but are not limited to: a same area in which terminal devices are located, a same service type corresponding to service data sent by the terminal devices, a same network slice (slice), or a same service requirement. The service type may include but is not limited to at least one of the following: voice, video, mobile broadband (MBB), enhanced Mobile Broadband (eMBB), massive Internet of Things (e.g. massive machine-type communications, mMTC), ultra-reliable low-latency communication (URLLC), narrowband Internet of Things (NB-IoT), and enhanced machine type communication (eMTC).

Optionally, terminal devices are grouped based on areas in which the terminal devices are located. For example, in scenarios such as Internet of Vehicles V2X communication, long term evolution-vehicle (LTE-V) communication, and vehicle to vehicle (V2V) communication, terminal devices in a same area may be grouped into a same terminal group. It may be understood that the area may be a cell, another defined geographical area, or the like.

Optionally, terminal devices are grouped based on service types corresponding to service data sent by the terminal devices. One terminal device may belong to one or more terminal groups. For example, the terminal device may send service data of a service type A, and may send service data of a service type B. In this case, the terminal device may belong to a terminal group corresponding to the service type A and a terminal group corresponding to the service type B.

In embodiments of this application, one routing device may correspond to one terminal group. In this implementation, one routing device is configured for each terminal group. The routing device may store routing information of a terminal device included in a corresponding terminal group. The routing information is for determining a path to the terminal device. Optionally, the routing information may include one or more of the following information: identification information of the terminal device, identification information of an access network device associated with the terminal device, and identification information of a routing device connected to the access network device. Optionally, in this implementation, the routing device may be a functional module (or may also be referred to as a logical node) in the access network device or the core network device. It may be understood that the access network device or the core network device includes a plurality of functional modules, and each of the plurality of functional modules corresponds to one terminal group, meaning that different functional modules correspond to different terminal groups.

Alternatively, one routing device may correspond to a plurality of terminal groups. In this implementation, the routing device may store routing information of a terminal device included in each of the plurality of terminal groups. Optionally, in this implementation, the routing device may be an entity device. For example, the routing device may be a UPF corresponding to a plurality of terminal groups.

In embodiments of this application, a group transmission channel corresponding to the terminal group may be for transmitting a data packet associated with the terminal group. Before the data packet associated with the terminal group is transmitted through the group transmission channel, the group transmission channel needs to be activated or created.

Activating a group transmission channel in embodiments of this application may mean that a transmission parameter of the group transmission channel is preconfigured in the routing device, and the group transmission channel may be activated according to an activation instruction. After the group transmission channel is activated, a data packet associated with a corresponding terminal group may be transmitted through the group transmission channel. Correspondingly, deactivating a group transmission channel may mean that the group transmission channel may be deactivated according to a deactivation instruction. After the group transmission channel is deactivated, data transmission terminates on the group transmission channel, but configuration of the transmission parameter of the group transmission channel is not changed or deleted. If the group transmission channel needs to be used again to transmit a data packet associated with the corresponding terminal group, the group transmission channel may be activated.

Creating a group transmission channel in embodiments of this application may mean that a transmission parameter of the group transmission channel is temporarily configured in the routing device, and a data packet associated with a corresponding terminal group may be transmitted through the group transmission channel after the transmission parameter of the group transmission channel is configured. Correspondingly, releasing a group transmission channel may mean that a transmission parameter of the group transmission channel is deleted from the routing device, and the group transmission channel does not exist after the transmission parameter of the group transmission channel is deleted. If a group transmission channel corresponding to the terminal group needs to be re-created, a transmission parameter of the group transmission channel corresponding to the terminal group may be re-configured. It may be understood that the re-configured transmission parameter may be the same as or different from the transmission parameter configured last time.

In embodiments of this application, a first routing device corresponding to the terminal group may mean a first routing device for forwarding a data packet associated with the terminal group.

In embodiments of this application, one or more terminal devices managed by the routing device may be understood as one or more terminal devices that belong to a terminal group corresponding to the routing device and that are in one or more cells managed by one or more access network devices connected to the routing device.

Synchronizing routing information in embodiments of this application may mean that a plurality of routing devices mutually exchange routing information stored in the plurality of routing devices, and mutually store the routing information stored, in addition to the routing information stored in respective routing devices. By synchronizing the routing information, the routing device not only stores routing information of terminal devices managed by the routing device, but also stores routing information of terminal devices managed by other routing devices. For example, a routing device A stores routing information of a terminal device managed by the routing device A, a routing device B stores routing information of a terminal device managed by the routing device B, and a routing device C stores routing information of a terminal device managed by the routing device C. Then, the routing information is synchronized among the routing device A, the routing device B, and the routing device C. After the routing information is synchronized, the routing device A, the routing device B, and the routing device C all store the routing information of the terminal device managed by the routing device A, the routing information of the terminal device managed by the routing device B, and the routing information of the terminal device managed by the routing device C.

Figure 3:
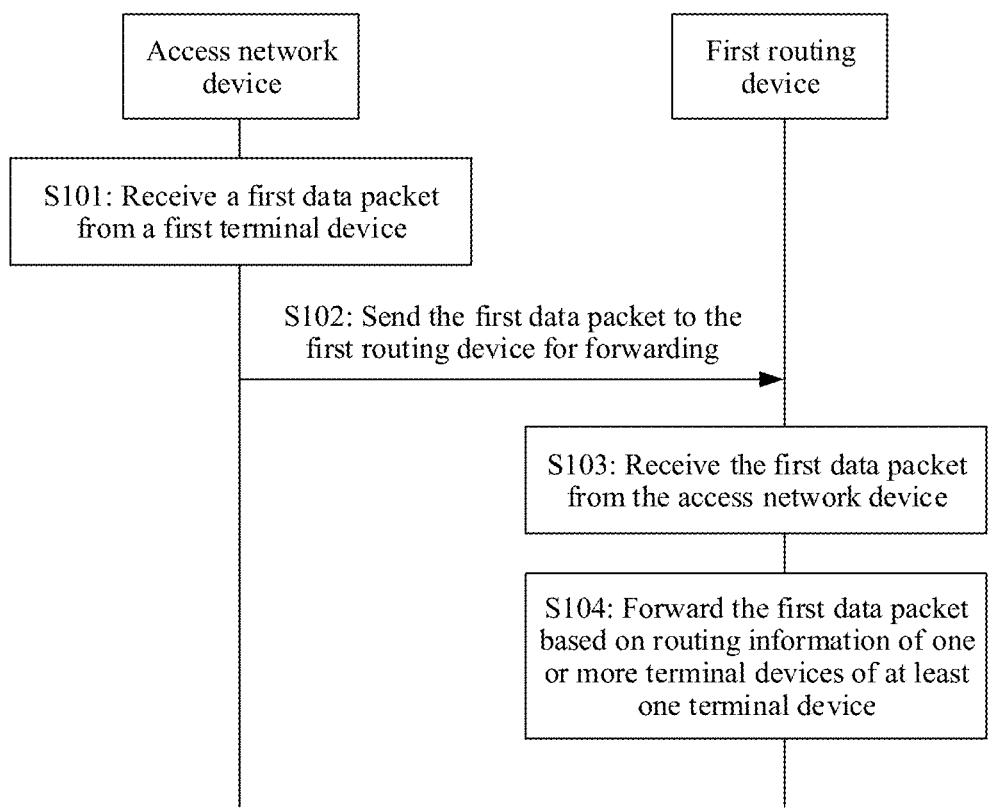
FIG. 3 is a schematic flowchart of a data transmission method according to an embodiment of this application.

FIG. 3 is a schematic flowchart of a data transmission method according to an embodiment of this application. As shown in the figure, the data transmission method provided in this embodiment of this application includes but is not limited to the following steps.

S101: An access network device receives a first data packet from a first terminal device, where the first data packet is associated with a terminal group, the terminal group includes at least one terminal device, and the first terminal device belongs to the terminal group.

In an embodiment, that the first data packet is associated with the terminal group may be: The first terminal device that sends the first data packet and/or a terminal device for receiving the first data packet belong/belongs to the terminal group. Optionally, the first data packet may include a group identifier of the terminal group, and the group identifier can uniquely indicate a terminal group. For example, the group identifier may include but is not limited to at least one type of information such as an IP multicast address, a MAC multicast address, or a terminal group identity (ID) of the terminal group. Alternatively, the terminal group associated with the first data packet may be indirectly determined in another manner. For example, if the terminal group corresponds to a service type, the terminal group associated with the first data packet may be determined based on a type of service data included in the first data packet. In another example, the first data packet may include identification information of the first terminal device. The access network device pre-stores a correspondence between identification information of each terminal device and each terminal group, so that the terminal group associated with the first data packet may be determined based on the identification information of the first terminal device.

It may be understood that, the access network device may determine the terminal group associated with the first data packet, or the access network device may interact with a core network device to determine the terminal group associated with the first data packet, or the core network device may determine the terminal group associated with the first data packet, and indicate, to the access network device, the terminal group associated with the first data packet.

Further optionally, the first data packet may be unicast data sent by the first terminal device to a third terminal device belonging to the terminal group, and the first data packet may include identification information of the third terminal device. Alternatively, the first data packet may be multicast data sent by the first terminal device, and the first data packet may include the group identifier of the terminal group, for example, a multicast address. Alternatively, the first data packet may be broadcast data sent by the first terminal device in a target service area, and the first data packet may include a target service area identifier or target service area information. The target service area identifier or the target service area information includes but is not limited to at least one of the following information or identifier: a cell identifier (or a cell list), a tracking area identifier (or a tracking area list), an access network notification area identifier (or an access network notification area list), a broadcast service area identifier (or a broadcast service area list), and a multicast service area identifier (or a multicast service area list).

In some embodiments, before receiving the first data packet from the first terminal device, the access network device activates a group transmission channel that corresponds to the terminal group and that is between the access network device and a first routing device, to transmit, through the activated group transmission channel, the data packet associated with the terminal group. Alternatively, the access network device creates a group transmission channel that corresponds to the terminal group and that is between the access network device and the first routing device, to transmit, through the created group transmission channel, the data packet associated with the terminal group. For details about activating the group transmission channel and creating the group transmission channel, refer to the descriptions in the foregoing embodiment. Details are not described herein again. The following separately uses two application scenarios of activating the group transmission channel and creating the group transmission channel as examples for description.

In a first optional implementation, a process in which the access network device activates the group transmission channel is as follows:

A network device determines a service area, and deploys, in the service area, a first routing device corresponding to a terminal group, where a transmission parameter of a group transmission channel corresponding to the terminal group is configured for the first routing device. The network device may be a base station, an operation and management (OAM) entity, or another network management device. It may be understood that, one or more routing devices may be deployed in the service area for one terminal group, and the one or more routing devices may be connected to different access network devices. For example, if the routing device is an SFG, an SFG corresponding to a terminal group A may be deployed in the service area. For example, an SFG #A-1 and an SFG #A-2 are separately deployed. The SFG #A-1 may be connected to an access network device A, and the SFG #A-2 may be connected to an access network device B. Certainly, one SFG may alternatively be connected to a plurality of access network devices. For example, the SFG #A-2 may further be connected to an access network device C. This is not limited in this embodiment of this application.

Transmission parameters of group transmission channels corresponding to the terminal group A are separately configured in the SFG #A-1 and the SFG #A-2. For example, a transmission parameter of a group transmission channel that corresponds to the terminal group A and that is between the SFG #A-1 and the access network device A is configured in the SFG #A-1, and a transmission parameter of a group transmission channel that corresponds to the terminal group A and that is between the SFG #A-2 and the access network device B is configured in the SFG #A-2. The transmission parameters of the group transmission channels corresponding to the terminal group configured in different SFGs may be different. The SFG may be a logical node or an entity device. This is not limited in this embodiment of this application. In this implementation scenario, the group transmission channel is not activated by default. Upon receiving a service request indicating the terminal group, the access network device activates the group transmission channel corresponding to the terminal group. For details, refer to descriptions in subsequent embodiments. Details are not described herein again. It may be understood that a routing device corresponding to one terminal group may be deployed in one service area, or routing devices corresponding to a plurality of terminal groups may be deployed in one service area. The routing devices corresponding to the plurality of terminal groups may be same routing devices, or may be different routing devices. For example, one terminal group corresponds to one routing device. For details, refer to the descriptions in the foregoing embodiment. Details are not described herein again.

Optionally, the service area may include but is not limited to a cell, a tracking area, an access network notification area, a broadcast service area, a multicast service area, and the like. The service area may be determined based on service area information or a service area identifier. The service area information or the service area identifier may include but is not limited to at least one of the following information or identifier: a cell identifier (or a cell list), a tracking area identifier (or a tracking area list), an access network notification area identifier (or an access network notification area list), a broadcast service area identifier (or a broadcast service area list), and a multicast service area identifier (or a multicast service area list).

Further optionally, the access network device receives a service request from a second terminal device, where the service request indicates that the second terminal device prepares to send, to the access network device, a data packet associated with the terminal group, and the second terminal device belongs to the terminal group. The second terminal device may be the same as or different from the first terminal device. This is not limited in this embodiment of this application.

In a first optional implementation, the service request may directly or indirectly indicate the terminal group. For example, the service request includes the group identifier of the terminal group, to directly indicate that the second terminal device prepares to send the data packet associated with the terminal group. Alternatively, in a passive call scenario, the access network device receives a paging request, where the paging request includes identification information of the to-be-paged second terminal device and/or a service type of service data sent by the second terminal device. When receiving the service request from the second terminal device, the access network device may indirectly determine, based on the pre-received paging request, a terminal group to which the second terminal device belongs.

The access network device determines the first routing device corresponding to the terminal group based on the service request, where the transmission parameter of the group transmission channel corresponding to the terminal group is preconfigured for the first routing device. The access network device further determines whether the group transmission channel corresponding to the terminal group is activated, and activates the group transmission channel if the group transmission channel corresponding to the terminal group has not been activated. The access network device may send activation indication information to the first routing device, to activate the group transmission channel corresponding to the terminal group; or the access network device may send activation indication information to the core network device, to activate, by using the core network device, the group transmission channel corresponding to the terminal group. After being activated, the activated group transmission channel may be used to transmit the data packet associated with the terminal group. It may be understood that if the access network device determines that the group transmission channel corresponding to the terminal group has been activated, the group transmission channel may not be repeatedly activated.

In a second optional implementation, a process in which the access network device creates the group transmission channel is as follows:

The access network device receives a service request from a second terminal device, where the service request indicates that the second terminal device prepares to send, to the access network device, a data packet associated with the terminal group, and the second terminal device belongs to the terminal group. The second terminal device may be the same as or different from the first terminal device. This is not limited in this embodiment of this application.

In an optional implementation, the service request may directly or indirectly indicate the terminal group. For details, refer to the descriptions in the foregoing embodiment. Details are not described herein again.

The access network device determines, based on the service request, whether the group transmission channel corresponding to the terminal group has been created. If the group transmission channel corresponding to the terminal group has not been created, the access network device temporarily creates a group transmission channel corresponding to the terminal group. For example, the access network device selects the first routing device, and configures, in the first routing device, a transmission parameter of the group transmission channel corresponding to the terminal group. The access network device may request the core network device to create, for the access network device, the group transmission channel corresponding to the terminal group, or the access network device may request the first routing device to create the group transmission channel corresponding to the terminal group. This is not limited in this embodiment of this application. The first routing device may be a routing device selected by the access network device from a plurality of routing devices, or may be a preconfigured routing device.

Based on the first optional implementation or the second optional implementation, the service request may further include identification information of the second terminal device. The identification information can be uniquely for determining the terminal device, or uniquely for determining the terminal device in the terminal group. For example, the identification information of the second terminal device may include but is not limited to at least one of the following identification information of the second terminal device: an Internet Protocol (IP) address, a media access control (MAC) address, a sub-identifier uniquely identifying UE in a group, an international mobile subscriber identity (IMSI), an international mobile equipment identity (IMEI), an electronic serial number (ESN), a mobile phone number, or a temporary identifier allocated by a mobile network to a terminal device.

The access network device may send a first routing information update request to the first routing device based on the identification information of the second terminal device in the service request, where the first routing information update request may include the identification information of the second terminal device, so that the first routing device may add routing information of the second terminal device to routing information stored in the first routing device, and the first routing device may learn of the identification information of the terminal device that belongs to the terminal group and that is managed by the first routing device. For example, the routing information of the second terminal device may include one or more of the following information: identification information of the first routing device, the identification information of the second terminal device, and identification information of the access network device.

Optionally, the first routing device may synchronize the stored routing information with at least one second routing device. The second routing device may be a routing device connected to another access network device, and the second routing device and the first routing device correspond to a same terminal group. The second routing device receives and forwards a data packet that is sent by the another access network device and that is associated with the terminal group. The second routing device stores routing information of a terminal device that belongs to the terminal group and that is in a cell managed by the another access network device. By synchronizing routing information between the first routing device and the at least one second routing device, the first routing device may obtain routing information of any terminal device belonging to the terminal group, to facilitate forwarding of data packets. For details, refer to subsequent descriptions in S104. Details are not described herein.

Optionally, the first routing device may alternatively send the stored routing information to a routing information centralized management device, where the routing information centralized management device stores a set of routing information, and the set of routing information includes the routing information stored in the first routing device and routing information stored in the at least one second routing device. For descriptions of the second routing device, refer to the descriptions in the foregoing embodiment. Details are not described herein again. The first routing device obtains the set of routing information from the routing information centralized management device, to obtain routing information of any terminal device belonging to the terminal group, facilitating forwarding of data packets. For details, refer to subsequent descriptions in S104. Details are not described herein.

It may be understood that the first routing device may be connected to one or more access network devices. Therefore, the routing information stored in the first routing device may include routing information of one or more terminal devices that belong to the terminal group and that are in one or more cells managed by the one or more access network devices. The terminal device belonging to the terminal group may add the routing information of the terminal device to the first routing device by sending a service request. For details, refer to the processing process of adding the routing information of the second terminal device to the first routing device. Details are not described herein again.

S102: The access network device sends the first data packet to the first routing device for forwarding.

The first routing device corresponds to the terminal group, the first routing device stores routing information of one or more of at least one terminal device belonging to the terminal group, the routing information is for forwarding the data packet associated with the terminal group, and the data packet associated with the terminal group includes the first data packet.

In an embodiment, a group transmission channel corresponding to the terminal group is activated between the access network device and the first routing device, or a group transmission channel corresponding to the terminal group is created between the access network device and the first routing device. The access network device may send, through the group transmission channel, the first data packet to the first routing device for forwarding.

Optionally, the first routing device may store routing information of some terminal devices in the terminal group. For example, the first routing device stores routing information of one or more terminal devices that belong to the terminal group and that are in one or more cells managed by one or more access network devices connected to the first routing device. In this scenario, the first terminal device may send data to the one or more terminal devices that belong to the terminal group and that are in the one or more cells managed by the one or more access network devices. Alternatively, the first routing device may store routing information of all terminal devices in the terminal group. For example, the first routing device may synchronize with at least one second routing device, to obtain the routing information of all the terminal devices in the terminal group. Alternatively, the first routing device obtains the set of routing information from the routing information centralized management device, to obtain the routing information of all the terminal devices in the terminal group. For details, refer to the descriptions in the foregoing embodiment. Details are not described herein again. In this scenario, the first terminal device may send data to any one or more terminal devices belonging to the terminal group.

S103: The first routing device receives the first data packet from the access network device.

S104: The first routing device forwards the first data packet based on the routing information of one or more of the at least one terminal device.

In an embodiment, the first routing device receives the first data packet from the access network device through the group transmission channel corresponding to the terminal group. The first routing device may determine, based on information in the first data packet, a terminal device for receiving the first data packet, and forward the first data packet based on the routing information of the one or more terminal devices in the terminal group.

For example, if the first data packet includes identification information of a third terminal device belonging to the terminal group, it may be determined that the terminal device for receiving the first data packet is the third terminal device. The first routing device searches stored routing information of a plurality of terminal devices belonging to the terminal group for routing information of the third terminal device, and forwards the first data packet to the third terminal device based on the routing information of the third terminal device. Optionally, the third terminal device and the first terminal device may be located in a cell managed by a same access network device, so that the first routing device determines, based on the routing information of the third terminal device, that the third terminal device is a terminal device in the cell managed by the access network device. The first routing device may forward the first data packet to the access network device, and the access network device sends the first data packet to the third terminal device.

Optionally, the third terminal device and the first terminal device may be located in cells managed by different access network devices. For example, the first terminal device is located in a cell managed by an access network device A, and the third terminal device is located in a cell managed by an access network device B. Both the access network device A and the access network device B may be connected to the first routing device. The first routing device determines, based on the routing information of the third terminal device, that the third terminal device is a terminal device in the cell managed by the access network device B. The first routing device may forward the first data packet to the access network device B, and the access network device B sends the first data packet to the third terminal device.

Alternatively, the access network device A and the access network device B may be separately connected to different routing devices. For example, if the access network device A is connected to the first routing device, and the access network device B is connected to the second routing device, the first routing device determines, based on the routing information of the third terminal device, that the third terminal device is a terminal device managed by the second routing device, and the first routing device may send the first data packet to the second routing device. The second routing device receives the first data packet, and searches, based on identification information of the third terminal device included in the first data packet, the stored routing information of the plurality of terminal devices belonging to the terminal group for the routing information of the third terminal device. The second routing device determines, based on the routing information of the third terminal device, that the third terminal device is a terminal device in a cell managed by the access network device B. The second routing device sends the first data packet to the access network device B, and then the access network device B sends the first data packet to the third terminal device. It may be understood that, in a process in which the first routing device sends the first data packet to the second routing device, the first data packet may alternatively be forwarded by another routing device, that is, the first routing device indirectly sends the first data packet to the second routing device.

For example, if the first data packet includes the target service area identifier or the target service area information, it may be determined that the terminal device for receiving the first data packet is a terminal device that is in the target service area and that belongs to the terminal group. The first routing device forwards, based on routing information of one or more terminal devices that belong to the terminal group and that are in the target service area, the first data packet to the terminal device that belongs to the terminal group and that is in the target service area.

For example, if the first data packet includes the group identifier of the terminal group but does not indicate information about another terminal device for receiving the first data packet, it may be determined that the terminal device receiving the first data packet is of all terminal devices belonging to the terminal group. The first routing device forwards, based on routing information of all the terminal devices belonging to the terminal device group, the first data packet to all the terminal devices belonging to the terminal group. It may be understood that, in this implementation, the first routing device may synchronize routing information with at least one second routing device in advance, to obtain the routing information of all the terminal devices belonging to the terminal group, or the first routing device may obtain the set of routing information from the routing information centralized management device in advance, to obtain the routing information of all the terminal devices belonging to the terminal group. For details, refer to the descriptions in the foregoing embodiment. Details are not described herein again.

Further optionally, as the first terminal device moves, the first terminal device may move out of the cell managed by the access network device. When detecting that the first terminal device moves out of the cell managed by the access network device, the access network device may further determine whether the cell managed by the access network device further includes a terminal device belonging to the terminal group. It may be determined, in the cell managed by the access network device, whether a terminal device in a connected mode or an inactive mode includes the terminal device belonging to the terminal group.

If it is determined that the cell managed by the access network device does not include the terminal device belonging to the terminal group, the access network device may deactivate or release the group transmission channel corresponding to the terminal group. If the first optional implementation is used to activate the group transmission channel in step S101, accordingly, the access network device may deactivate the group transmission channel when determining that the cell managed by the access network device does not include the terminal device belonging to the terminal group. If the second optional implementation is used to create the group transmission channel in step S101, accordingly, the access network device may release the group transmission channel when determining that the cell managed by the access network device does not include the terminal device belonging to the terminal group. It may be understood that the access network device may interact with the first routing device to deactivate or release the group transmission channel.

If it is determined that the cell managed by the access network device further includes the terminal device belonging to the terminal group, the access network device may send a second routing information update request to the first routing device, where the second routing information update request requests to delete routing information of the first terminal device from the first routing device.

As the first terminal device moves, when the first terminal device moves out of the cell managed by the access network device, the group transmission channel corresponding to the terminal group is not deactivated or released provided that the cell managed by the access network device further includes the terminal device belonging to the terminal group, so as to reduce signaling overheads.

Figure 4A:
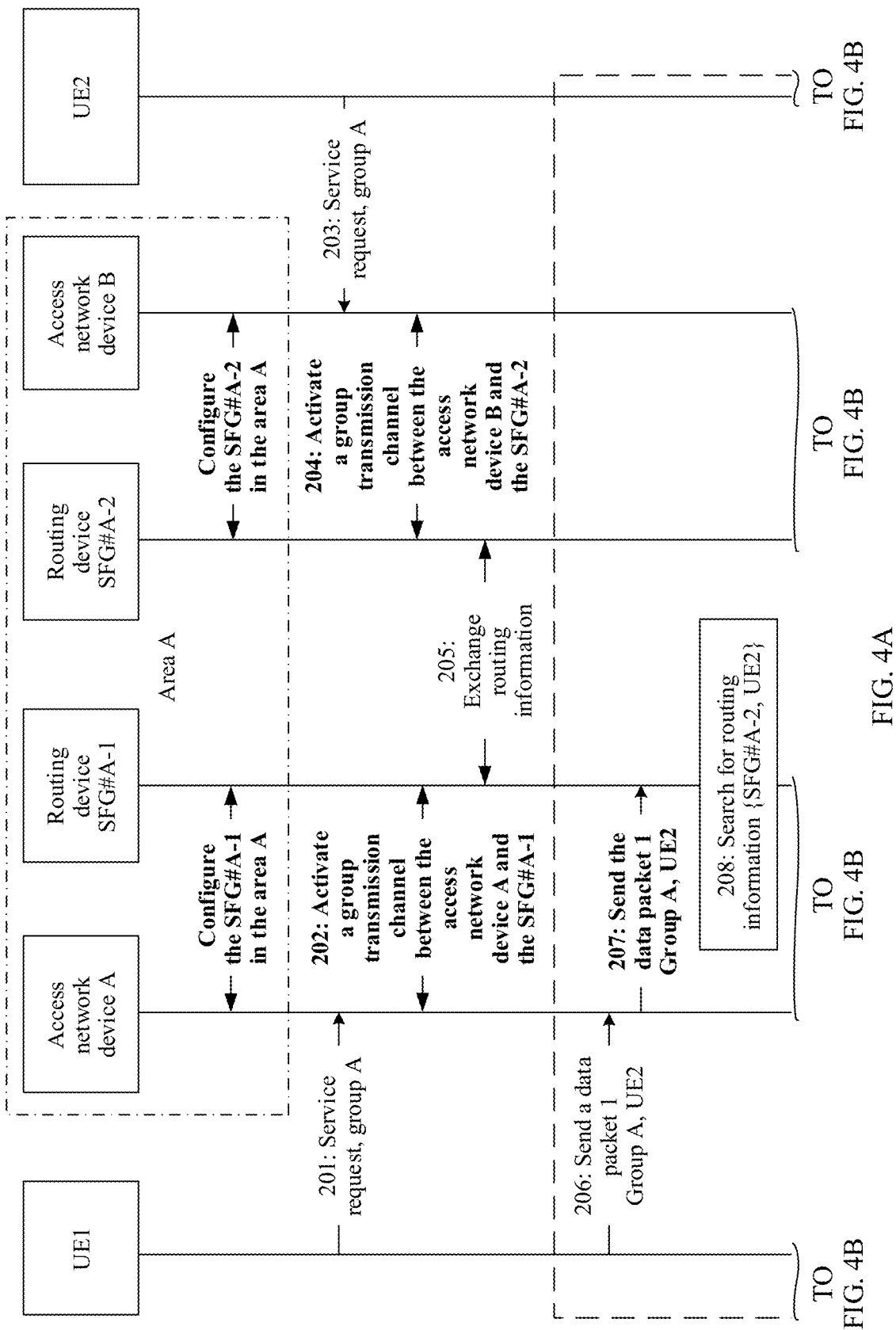
FIG. 4A and FIG. 4B are a schematic flowchart of data transmission performed by an SFG according to an embodiment of this application.
Figure 4B:
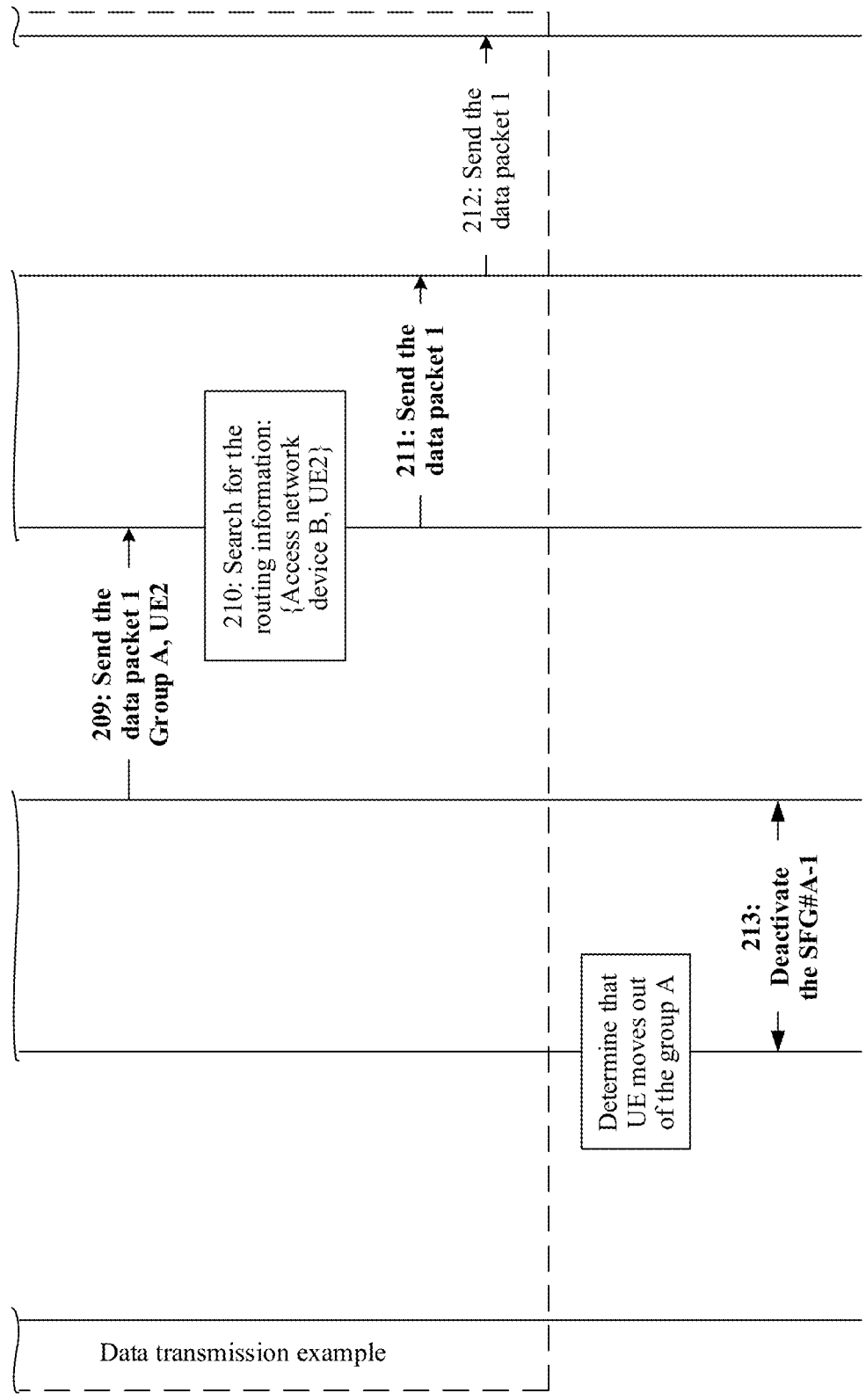
Figure 5:
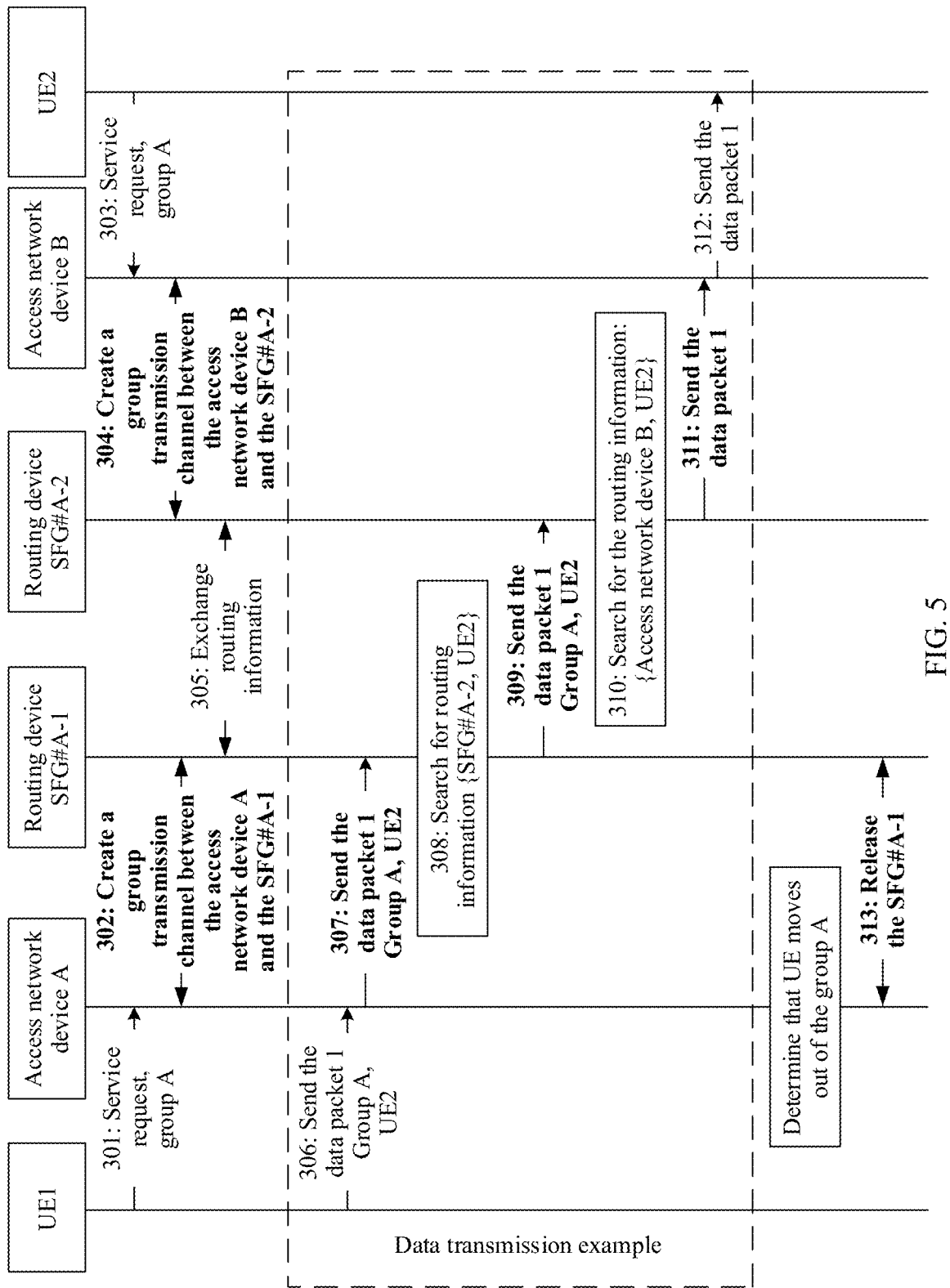
FIG. 5 is a schematic flowchart of data transmission performed by an SFG according to an embodiment of this application.

The method shown in FIG. 3 is described in more detail with reference to FIG. 4A and FIG. 4B and FIG. 5. For ease of understanding, in FIG. 4A and FIG. 4B and FIG. 5, an example in which the terminal device is UE, the routing devices are an SFG, the first routing device is an SFG #A-1, and the second routing device is an SFG #A-2 is used for description. The SFG #A-1 and the SFG #A-2 separately correspond to a terminal group A. In FIG. 4A and FIG. 4B and FIG. 5, an example in which an SFG #A is deployed in an access network and one SFG #A may be connected to one access network device is used for description. For details, refer to the method for deploying a routing device shown in FIG. 2. It may be understood that the SFG #A may alternatively be deployed in a core network, and one SFG #A may be further connected to a plurality of access network devices.

Refer to FIG. 4A and FIG. 4B. The data transmission method in this embodiment of this application is described by using an example in which a group transmission channel is activated and the group transmission channel is deactivated. The implementation includes but is not limited to the following steps:

Before the group transmission channel is activated, an SFG corresponding to the terminal group A is deployed in a service area A, and a parameter of the group transmission channel corresponding to the terminal group A is preconfigured.

Specifically, a network device determines the service area A, and deploys, in the service area A, the SFG corresponding to the terminal group A. For example, the SFG #A-1 and the SFG #A-2 are deployed. Transmission parameters of the group transmission channels corresponding to the terminal group A are preconfigured in the SFG #A-1 and the SFG #A-2. The SFG #A-1 is connected to an access network device A, and the SFG #A-2 is connected to an access network device B. The network device may be a base station, an OAM entity, or another network management device. Both UE1 and UE2 belong to the terminal group A.

Optionally, the service area may be identified based on service area information or a service area identifier. For descriptions of the service area information or the service area identifier, refer to the descriptions in the foregoing embodiment. Details are not described herein again. The SFG #A-1 and the SFG #A-2 in the service area are not activated by default.

Step 201: The UE1 sends a service request to the access network device A, where the service request indicates a group identifier (referred to as a group A below) of a terminal group to which the UE1 belongs.

Optionally, the service request may directly indicate the group identifier of the terminal group, or may indirectly indicate the group identifier of the terminal group. Optionally, the UE1 may further send identification information of the UE1 to the access network device A. The identification information of the terminal device can uniquely determine the terminal device. For details, refer to the descriptions in the foregoing embodiment. Details are not described herein again.

Step 202: The access network device A receives the service request from the UE1, and activates a group transmission channel that is between the access network device A and the SFG #A-1 and that corresponds to the terminal group A.

Optionally, the access network device A may further send the identification information of the UE1 to the SFG #A-1, so that the SFG #A-1 may determine the identification information of the UE1 managed by the SFG #A-1, to maintain and update stored routing information.

Step 203: The UE2 sends a service request to the access network device B, where the service request indicates that a group identifier of a terminal group to which the UE2 belongs is the group A.

Optionally, the service request may directly indicate the group identifier of the terminal group, or may indirectly indicate the group identifier of the terminal group. Optionally, the UE2 may further send identification information of the UE2 to the access network device B. The identification information of the terminal device can uniquely determine the terminal device. For details, refer to the descriptions in the foregoing embodiment. Details are not described herein again.

Step 204: The access network device B receives the service request from the UE2, and activates a group transmission channel that is between the access network device B and the SFG #A-2 and that corresponds to the terminal group A.

Optionally, the access network device B may further send the identification information of the UE2 to the SFG #A-2, so that the SFG #A-2 may determine the identification information of the UE2 managed by the SFG #A-2, to maintain and update stored routing information.

For example, the SFG #A-1 and the SFG #A-2 may be deployed on the access network side. The access network device A may notify the SFG #A-1 to activate the group transmission channel corresponding to the terminal group A, and the access network device B may notify the SFG #A-2 to activate the group transmission channel corresponding to the terminal group A. Alternatively, the SFG #A-1 and the SFG #A-2 may be deployed on the core network side, for example, deployed in a core network device. In this case, the access network device A may notify, via the core network device, the SFG #A-1 to activate the group transmission channel corresponding to the terminal group A, and the access network device B may notify, via the core network device, the SFG #A-2 to activate the group transmission channel corresponding to the terminal group A.

Step 205: The SFG #A-1 and the SFG #A-2 synchronize respective stored routing information, where the routing information stored in the SFG #A-1 includes routing information of a terminal device managed by the SFG #A-1, and the routing information stored in the SFG #A-2 includes routing information of a terminal device managed by the SFG #A-2.

For example, the routing information may include identification information of the SFG #A and identification information of the terminal device managed by the SFG #A.

Optionally, if there is a routing information centralized management device, step 205 may be replaced as follows: The SFG #A-1 and the SFG #A-2 send stored routing information to the routing information centralized management device, where a set of routing information is formed by the routing information centralized management device based on the routing information sent by the SFG #A-1 and the SFG #A-2. Further optionally, the SFG #A-1 and the SFG #A-2 may further obtain the set of routing information from the routing information centralized management device. The set of routing information includes routing information sent by the SFG #A-1 and routing information sent by the SFG #A-2. It may be understood that the set of routing information may further include routing information sent by another SFG #A.

Step 206: The UE1 sends a data packet 1 to the access network device A in which the UE1 is located, where the data packet 1 may include the group identifier of the terminal group, for example, the group A.

The group identifier of the terminal group may uniquely indicate the terminal group. For example, the group identifier may include but is not limited to at least one of the following information: an IP multicast address, a MAC multicast address, and the like of the terminal group.

Optionally, if the data packet 1 is unicast data sent to the UE2, the data packet 1 further includes the identification information of the UE2.

Optionally, if the data packet 1 is sent to a terminal device that belongs to the terminal group and that is in a target service area, the data packet 1 may include an identifier of the target service area or information about the target service area.

Step 207: The access network device A sends the data packet 1 to the SFG #A-1 through the activated group transmission channel corresponding to the terminal group A.

Step 208: The SFG #A-1 searches for routing information of the UE2.

Step 209: The SFG #A-1 forwards the data packet 1 based on information about the data packet 1 and the routing information of the UE2.

For example, if the SFG #A-1 determines, based on the information about the data packet 1 and the routing information of the UE2, that the UE2 is a terminal device managed by the SFG #A-2, the SFG #A-1 forwards the data packet 1 to the SFG #A-2. It may be understood that the SFG #A-1 may directly forward the data packet 1 to the SFG #A-2, or forward the data packet 1 to the SFG #A-2 via another SFG #A.

In another example, if the SFG #A-1 determines, based on the information about the data packet 1 and the routing information of the UE2, that the UE1 and the UE2 are located in a same access network device, the SFG #A-1 forwards the data packet 1 to the access network device A.

Step 210: The SFG #A-2 receives the data packet 1, searches for the routing information of the UE2, and determines that the UE2 is a terminal device in a cell managed by the access network device B.

Step 211: The SFG #A-2 sends the data packet 1 to the access network device B through the activated group transmission channel corresponding to the terminal group A.

Step 212: The access network device B sends the data packet 1 to the UE2.

Step 213: The access network device A determines that the UE1 moves out of a cell managed by the access network device A, and the cell managed by the access network device A does not include a terminal device belonging to the terminal group A. In this case, the access network device A may interact with the SFG #A-1, to perform a procedure of deactivating the group transmission channel corresponding to the terminal group A, so as to deactivate the group transmission channel corresponding to the terminal group A.

Refer to FIG. 5. The data transmission method in this embodiment of this application is described by using an example in which a group transmission channel is created and the group transmission channel is released. The implementation includes but is not limited to the following steps:

Step 301: UE1 sends a service request to an access network device A, where the service request indicates that a group identifier of a terminal group to which the UE1 belongs is a group A.

For specific descriptions of this step, refer to step 201 in the embodiment shown in FIG. 4A.

Step 302: The access network device A receives the service request from the UE1, and creates, between the access network device A and an SFG #A-1, a group transmission channel corresponding to the terminal group. For a method for creating the group transmission channel, refer to the descriptions in the foregoing embodiment. Details are not described herein again.

The access network device A may further send identification information of the UE1 to the SFG #A-1, so that the SFG #A-1 may determine the identification information of the UE managed by the SFG #A-1, to maintain and update stored routing information.

Step 303: UE2 sends a service request to an access network device B, where the service request indicates that a group identifier of a terminal group to which the UE2 belongs is the group A.

For specific descriptions of this step, refer to step 203 in the embodiment shown in FIG. 4A.

Step 304: The access network device B receives the service request from the UE2, and creates, between the access network device B and an SFG #A-2, a group transmission channel corresponding to the terminal group. For a method for creating the group transmission channel, refer to the descriptions in the foregoing embodiment. Details are not described herein again.

The access network device B may further send identification information of the UE2 to the SFG #A-2, so that the SFG #A-2 may determine the identification information of the UE managed by the SFG #A-2, to maintain and update stored routing information.

For example, the SFG #A-1 and the SFG #A-2 may be deployed on the access network side. The access network device A may notify the SFG #A-1 to create the group transmission channel corresponding to the terminal group A, and the access network device B may notify the SFG #A-2 to create the group transmission channel corresponding to the terminal group A. Alternatively, the SFG #A-1 and the SFG #A-2 may be deployed on the core network side, for example, deployed in a core network device. In this case, the access network device A may create, by using the core network device, the group transmission channel that corresponds to the terminal group A and that is between the access network device A and the SFG #A-1, and the access network device B may create, by using the core network device, the group transmission channel that corresponds to the terminal group A and that is between the access network device B and the SFG #A-2.

Step 305: The SFG #A-1 and the SFG #A-2 synchronize respective stored routing information, where the routing information stored in the SFG #A-1 includes routing information of a terminal device managed by the SFG #A-1, and the routing information stored in the SFG #A-2 includes routing information of a terminal device managed by the SFG #A-2.

For specific descriptions of this step, refer to step 205 in the embodiment shown in FIG. 4A. Details are not described herein again.

Step 306: The UE1 sends a data packet 1 to the access network device A in which the UE1 is located, where the data packet 1 may include the group identifier of the terminal group, for example, the group A.

For specific descriptions of this step, refer to step 206 in the embodiment shown in FIG. 4A. Details are not described herein again.

Step 307: The access network device A sends the data packet 1 to the SFG #A-1 through the created group transmission channel corresponding to the terminal group A.

Step 308: The SFG #A-1 searches for routing information of the UE2.

Step 309: The SFG #A-1 forwards the data packet 1 based on information about the data packet 1 and the routing information of the UE2.

For specific descriptions of this step, refer to step 209 in the embodiment shown in FIG. 4B. Details are not described herein again.

Step 310: The SFG #A-2 receives the data packet 1, searches for the routing information of the UE2, and determines that the UE2 is a terminal device in a cell managed by the access network device B.

For specific descriptions of this step, refer to step 104 in the embodiment shown in FIG. 3. Details are not described herein again.

Step 311: The SFG #A-2 sends the data packet 1 to the access network device B through the created group transmission channel corresponding to the terminal group A.

Step 312: The access network device B sends the data packet 1 to the UE2.

For specific descriptions of this step, refer to step 212 in the embodiment shown in FIG. 4B. Details are not described herein again.

Step 313: The access network device A determines that the UE1 moves out of a cell managed by the access network device A, and the cell managed by the access network device A does not include a terminal device belonging to the terminal group A. In this case, the access network device A may interact with the SFG #A-1, to perform a procedure of releasing the group transmission channel corresponding to the terminal group A, so as to release the group transmission channel corresponding to the terminal group A. For a specific release procedure, refer to the descriptions in the foregoing embodiment. Details are not described herein again.

It may be understood that, in embodiments of this application, the access network device and/or the routing device may perform some or all steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application may be necessarily performed.

The method provided in embodiments of this application is described above in detail with reference to FIG. 2 to FIG. 5. Apparatuses provided in embodiments of this application are described below in detail with reference to FIG. 6 and FIG. 9.

Figure 6:
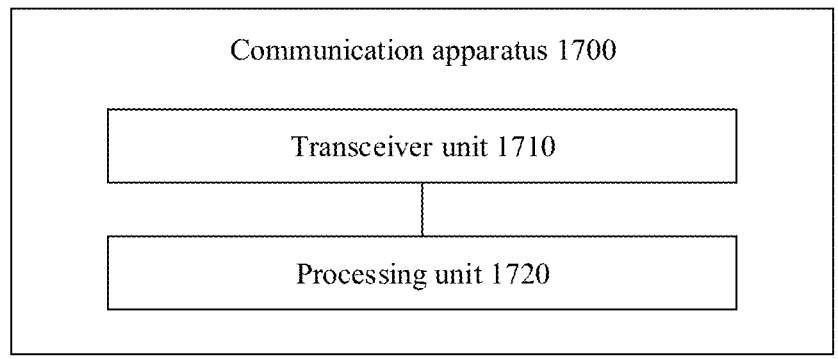
FIG. 6 is a schematic block diagram of a communication apparatus according to an embodiment of this application.

FIG. 6 is a schematic block diagram of a communication apparatus according to an embodiment of this application. As shown in FIG. 6, the communication apparatus 1700 may include a transceiver unit 1710 and a processing unit 1720. The transceiver unit 1710 and the processing unit 1720 may be software, hardware, or a combination of the software and the hardware.

The transceiver unit 1710 may include a sending unit and a receiving unit. The sending unit is configured to implement a sending function, the receiving unit is configured to implement a receiving function, and the transceiver unit 1710 may implement the sending function and/or the receiving function. The transceiver unit may alternatively be described as a communication unit.

Optionally, the transceiver unit 1710 may be configured to receive information (or a message) sent by another apparatus, and may be further configured to send information (or a message) to the another apparatus. The processing unit 1720 may be configured to perform internal processing of the apparatus.

In a possible design, the communication apparatus 1700 may correspond to the access network device in the foregoing method embodiments. For example, the communication apparatus 1700 may be the access network device, or may be a chip in the access network device. The communication apparatus 1700 may include units configured to perform the operations performed by the access network device in the foregoing method embodiments. In addition, the units in the communication apparatus 1700 are separately configured to perform the operations performed by the access network device in the foregoing method embodiments.

For example, the processing unit 1720 is configured to perform the following operations by using the transceiver unit 1710: receive a first data packet from a first terminal device, where the first data packet is associated with a terminal group, the terminal group includes at least one terminal device, and the first terminal device belongs to the terminal group; and send the first data packet to a first routing device for forwarding, where the first routing device corresponds to the terminal group, the first routing device stores routing information of one or more of the at least one terminal device, the routing information is for forwarding a data packet associated with the terminal group, and the data packet associated with the terminal group includes the first data packet.

Optionally, the first routing device is configured in the access network device, or the first routing device is configured in a core network device.

The first routing device is connected to one or more access network devices.

Optionally, that the first data packet is associated with a terminal group includes: The first data packet includes a group identifier of the terminal group.

Optionally, a type of service data included in the first data packet is a service type corresponding to the terminal group.

Optionally, the processing unit 1720 is specifically configured to perform the following operation by using the transceiver unit 1710: send, through a group transmission channel established between the access network device and the first routing device, the first data packet to the first routing device for forwarding, where the group transmission channel is for transmitting a data packet associated with the terminal group.

Optionally, the processing unit 1720 is further configured to perform the following operation by using the transceiver unit 1710: receive a service request from a second terminal device, where the service request indicates that the second terminal device prepares to send, to the access network device, a data packet associated with the terminal group, and the second terminal device belongs to the terminal group.

The processing unit 1720 is further configured to activate the group transmission channel based on the service request.

Optionally, the processing unit 1720 is further configured to perform the following operation by using the transceiver unit 1710: receive a service request from a second terminal device, where the service request indicates that the second terminal device prepares to send, to the access network device, a data packet associated with the terminal group, and the second terminal device belongs to the terminal group.

The processing unit 1720 is further configured to create the group transmission channel based on the service request.

Optionally, the service request further includes identification information of the second terminal device, and the processing unit 1720 is further configured to perform the following operation by using the transceiver unit 1710: send a first routing information update request to the first routing device, where the first routing information update request requests to add routing information of the second terminal device to the first routing device.

Optionally, the processing unit 1720 is further configured to deactivate the group transmission channel if it is detected that the first terminal device moves out of a cell managed by the access network device and it is determined that the cell managed by the access network device does not include the terminal device belonging to the terminal group.

Optionally, the processing unit 1720 is further configured to release the group transmission channel if it is detected that the first terminal device moves out of a cell managed by the access network device and it is determined that the cell managed by the access network device does not include the terminal device belonging to the terminal group.

The processing unit 1720 is further configured to perform the following operation by using the transceiver unit 1710: send a second routing information update request to the first routing device if it is detected that the first terminal device moves out of the cell managed by the access network device and it is determined that the cell managed by the access network device further includes the terminal device belonging to the terminal group, where the second routing information update request requests to delete routing information of the first terminal device from the first routing device.

In a possible design, the communication apparatus 1700 may correspond to the first routing device in the foregoing method embodiments. For example, the communication apparatus 1700 may be the first routing device, or may be a chip in the first routing device. The communication apparatus 1700 may include units configured to perform the operations performed by the first routing device in the foregoing method embodiments. In addition, the units in the communication apparatus 1700 are separately configured to perform the operations performed by the first routing device in the foregoing method embodiments.

For example, the processing unit 1720 is configured to perform the following operations by using the transceiver unit 1710: receive a first data packet from an access network device, where the first data packet is associated with a terminal group, the terminal group includes at least one terminal device, the first routing device is configured to forward a data packet associated with the terminal group, and the data packet associated with the terminal group includes the first data packet; and forward the first data packet based on routing information of one or more of the at least one terminal device.

Optionally, the routing information is obtained through synchronization by the first routing device with at least one second routing device, or the routing information is obtained by the first routing device from a routing information centralized management device, where the routing information centralized management device is configured to manage routing information stored in the first routing device and the at least one second routing device.

In a possible design, the communication apparatus 1700 may correspond to the second routing device in the foregoing method embodiments in FIG. 3 to FIG. 5. For example, the communication apparatus 1700 may be the second routing device, or may be a chip in the second routing device. The communication apparatus 1700 may include units configured to perform the operations performed by the second routing device in the foregoing method embodiments in FIG. 3. In addition, the units in the communication apparatus 1700 are separately configured to perform the operations performed by the second routing device in the foregoing method embodiments.

In a possible design, the communication apparatus 1700 may correspond to the routing information centralized management device in the foregoing method embodiments in FIG. 3 to FIG. 5. For example, the communication apparatus 1700 may be the routing information centralized management device, or may be a chip in the routing information centralized management device. The communication apparatus 1700 may include units configured to perform the operations performed by the routing information centralized management device in the foregoing method embodiments in FIG. 3. In addition, the units in the communication apparatus 1700 are separately configured to perform the operations performed by the routing information centralized management device in the foregoing method embodiments.

In a possible design, the communication apparatus 1700 may correspond to the terminal device (for example, the UE) in the foregoing method embodiments in FIG. 3 to FIG. 5. For example, the communication apparatus 1700 may be the terminal device, or may be a chip in the terminal device. The communication apparatus 1700 may include units configured to perform the operations performed by the terminal device in the foregoing method embodiments in FIG. 3 to FIG. 5. In addition, the units in the communication apparatus 1700 are separately configured to perform the operations performed by the terminal device in the foregoing method embodiments.

Figure 7:
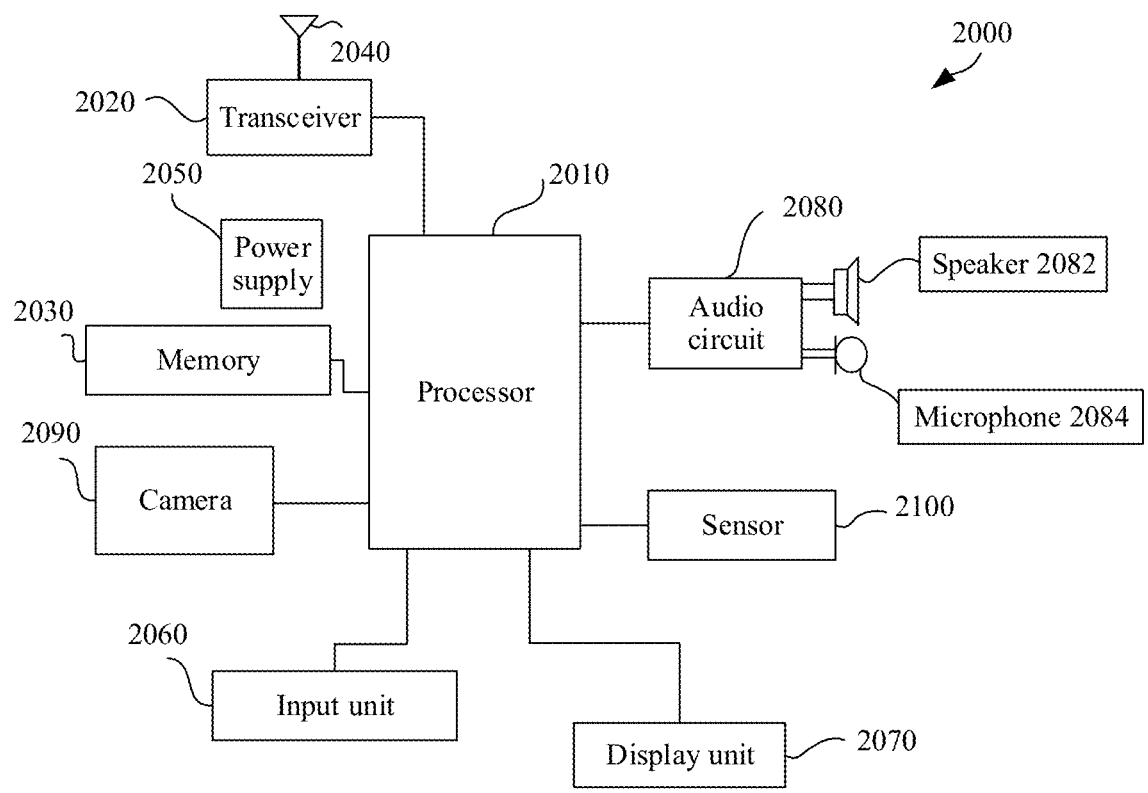
FIG. 7 is a schematic diagram of a structure of a terminal device according to an embodiment of this application.

It should be understood that when the communication apparatus 1700 is UE, the transceiver unit 1710 in the communication apparatus 1700 may correspond to a transceiver 2020 in a terminal device 2000 shown in FIG. 7, and the processing unit 1720 in the communication apparatus 1700 may correspond to a processor 2010 in the terminal device 2000 shown in FIG. 7.

It should be further understood that, when the communication apparatus 1700 is a chip disposed in the UE, the transceiver unit 1710 in the communication apparatus 1700 may be an input/output interface.

Figure 8:
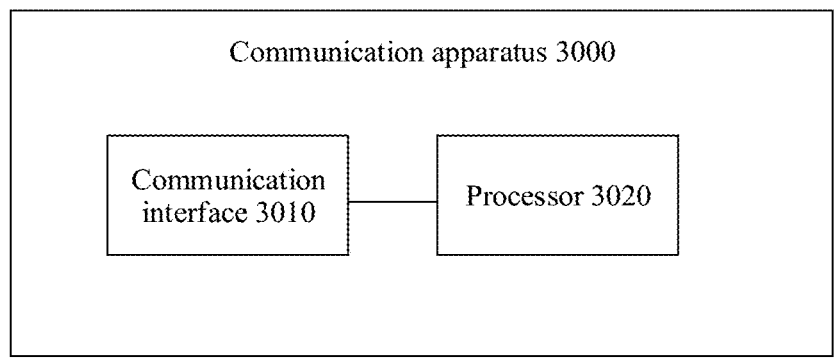
FIG. 8 is a schematic block diagram of another communication apparatus according to an embodiment of this application.

It should be understood that when the communication apparatus 1700 corresponds to the access network device, the first routing device, the second routing device, or the routing information centralized management device, the transceiver unit 1710 in the communication apparatus 1700 may correspond to a communication interface 3010 shown in FIG. 8, and the processing unit 1720 may correspond to a processor 3020 shown in FIG. 8.

FIG. 7 is a schematic diagram of a structure of the terminal device 2000 according to an embodiment of this application. The terminal device 2000 may be used in the system shown in FIG. 1, to perform functions of the terminal device (or the UE) in the foregoing method embodiments. As shown in FIG. 7, the terminal device 2000 includes the processor 2010 and the transceiver 2020. Optionally, the terminal device 2000 further includes a memory 2030. The processor 2010, the transceiver 2002, and the memory 2030 may communicate with each other through an internal connection path, to transfer a control signal or a data signal. The memory 2030 is configured to store a computer program. The processor 2010 is configured to invoke the computer program from the memory 2030 and run the computer program, to control the transceiver 2020 to receive and send a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030, to implement the foregoing function. During specific implementation, the memory 2030 may alternatively be integrated into the processor 2010, or may be independent of the processor 2010. The processor 2010 may correspond to the processing unit in FIG. 6.

The transceiver 2020 may correspond to the transceiver unit in FIG. 6. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that, the terminal device 2000 shown in FIG. 7 can implement processes related to the terminal device in any one of the foregoing method embodiments. Operations or functions of modules in the terminal device 2000 are separately intended to implement corresponding processes in the foregoing method embodiments. For details, refer to the descriptions in the foregoing method embodiments. To avoid repetition, detailed descriptions are properly omitted herein.

The processor 2010 may be configured to perform an action implemented inside the terminal device in the foregoing method embodiments, and the transceiver 2020 may be configured to perform an action of sending by the terminal device to the network side or receiving from the network side in the foregoing method embodiments. For details, refer to the descriptions in the foregoing method embodiments. Details are not described herein again.

Optionally, the terminal device 2000 may further include a power supply 2050, configured to supply power to various components or circuits in the terminal device.

In addition, to improve the functions of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 8 is a schematic diagram of a structure of a communication apparatus according to an embodiment of this application. It should be understood that the communication apparatus 3000 shown in FIG. 8 is merely an example. The communication apparatus in this embodiment of this application may further include other modules or units, or include modules having functions similar to those of modules in FIG. 8, or does not necessarily need to include all the modules in FIG. 8.

The communication apparatus 3000 includes the communication interface 3010 and the at least one processor 3020.

The communication apparatus 3000 may correspond to any network element or device in the access network device, the first routing device, the second routing device, and the routing information centralized management device. The at least one processor 3020 executes program instructions, to enable the communication apparatus 3000 to implement the corresponding procedure of the method performed by the corresponding network element in the foregoing method embodiments.

In a possible design, the communication apparatus 3000 may correspond to the access network device in the foregoing method embodiments. For example, the communication apparatus 3000 may be the access network device, or may be a chip in the access network device. The communication apparatus 3000 may include a component configured to perform the operations performed by the access network device in the foregoing method embodiments.

For example, the processor 3020 is configured to perform the following operations by using the communication interface 3010: receive a first data packet from a first terminal device, where the first data packet is associated with a terminal group, the terminal group includes at least one terminal device, and the first terminal device belongs to the terminal group; and send the first data packet to a first routing device for forwarding, where the first routing device corresponds to the terminal group, the first routing device stores routing information of one or more of the at least one terminal device, the routing information is for forwarding a data packet associated with the terminal group, and the data packet associated with the terminal group includes the first data packet.

In a possible design, the communication apparatus 3000 may correspond to the first routing device in the foregoing method embodiments. For example, the communication apparatus 3000 may be the first routing device, or may be a chip in the first routing device. The communication apparatus 3000 may include a component configured to perform the operations performed by the first routing device in the foregoing method embodiments.

For example, the processor 3020 is configured to perform the following operations by using the communication interface 3010: receive a first data packet from an access network device, where the first data packet is associated with a terminal group, the terminal group includes at least one terminal device, the first routing device is configured to forward a data packet associated with the terminal group, and the data packet associated with the terminal group includes the first data packet; and forward the first data packet based on routing information of one or more of the at least one terminal device.

Optionally, the communication apparatus 3000 may further include a memory. The memory may store the program instructions, and the at least one processor 3020 may read the program instructions stored in the memory, and execute the program instructions.

Figure 9:
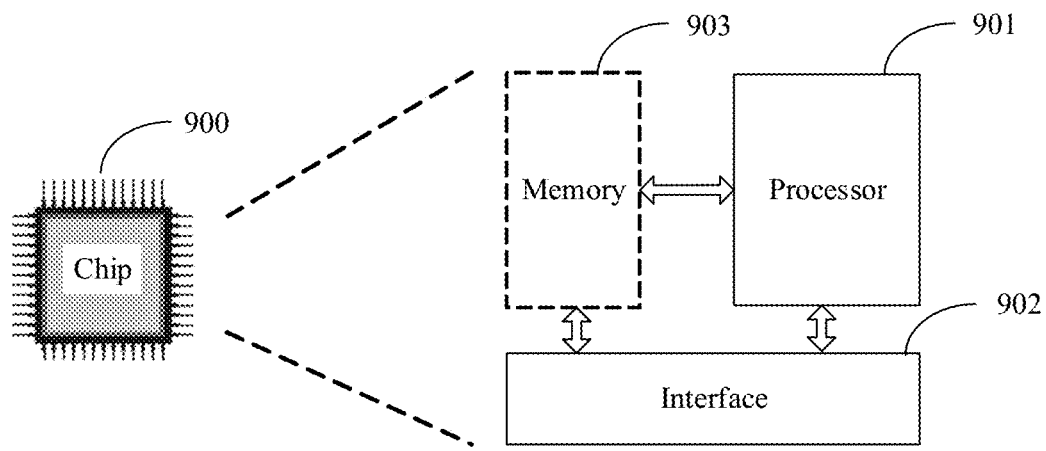
FIG. 9 is a schematic diagram of a structure of a chip according to an embodiment of this application.

For a case in which the communication apparatus may be a chip or a chip system, refer to a schematic diagram of a structure of a chip shown in FIG. 9. The chip 900 shown in FIG. 9 includes a processor 901 and an interface 902. There may be one or more processors 901 and a plurality of interfaces 902. It should be noted that a function corresponding to each of the processor 901 and the interface 902 may be implemented by using a hardware design, may be implemented by using a software design, or may be implemented by a combination of software and hardware. This is not limited herein.

In a possible design, in a case in which the chip is configured to implement functions of the access network device in this embodiment of this application, the processor 901 is configured to perform the following operations through the interface 902: receive a first data packet from a first terminal device, where the first data packet is associated with a terminal group, the terminal group includes at least one terminal device, and the first terminal device belongs to the terminal group; and send the first data packet to a first routing device for forwarding, where the first routing device corresponds to the terminal group, the first routing device stores routing information of one or more of the at least one terminal device, the routing information is for forwarding a data packet associated with the terminal group, and the data packet associated with the terminal group includes the first data packet.

In a case in which the chip is configured to implement functions of the first routing device in this embodiment of this application, the processor 901 is configured to perform the following operations through the interface 902: receive a first data packet from an access network device, where the first data packet is associated with a terminal group, the terminal group includes at least one terminal device, the first routing device is configured to forward a data packet associated with the terminal group, and the data packet associated with the terminal group includes the first data packet; and forward the first data packet based on routing information of one or more of the at least one terminal device.

Optionally, the chip further includes a memory 903, and the memory 903 is configured to store program instructions and data.

The processor in this embodiment of this application may be a central processing unit (Central Processing Unit, CPU), or the processor may be another general-purpose processor, a digital signal processor (digital signal processor, DSP), an application-specific integrated circuit (application-specific integrated circuit, ASIC), a field programmable gate array (field programmable gate array, FPGA), another programmable logic device, a discrete gate or a transistor logic device, a discrete hardware component, or the like. The general-purpose processor may be a microprocessor, or the processor may be any conventional processor or the like.

According to the method provided in embodiments of this application, this application further provides a computer program product. The computer program product includes computer program code. When the computer program code is run on a computer, the computer is enabled to perform the method on the access network device side or the method on the first routing device side according to any one of the foregoing method embodiments.

In another embodiment of this application, a communication system is further provided. The communication system includes an access network device and/or a first routing device. Optionally, the communication system may further include a terminal device. For example, the access network device may be the access network device provided in FIG. 3 to FIG. 5, and is configured to perform the steps of the access network device in the data transmission method provided in FIG. 3 to FIG. 5; and/or the first routing device may be the first routing device provided in FIG. 3 to FIG. 5, and is configured to perform the steps of the first routing device in the data transmission method provided in FIG. 3 to FIG. 5.

An embodiment of this application further provides a processing apparatus, including a processor and an interface. The processor is configured to perform the method according to any one of the foregoing method embodiments.

It should be understood that the processing apparatus may be a chip. For example, the processing apparatus may be a field programmable gate array (FPGA), may be a general-purpose processor, a digital signal processor (DSP), an application-specific integrated circuit (ASIC), the field programmable gate array (FPGA), another programmable logic device, a discrete gate, a transistor logic device, or a discrete hardware component, may be a system on chip (SoC), may be a central processing unit (CPU), may be a network processor (NP), may be a digital signal processing circuit (DSP), may be a micro controller unit (MCU), or may be a programmable controller (PLD) or another integrated chip. The processing apparatus may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a non-volatile memory, or may include a volatile memory and a non-volatile memory. The nonvolatile memory may be a read-only memory (ROM), a programmable ROM (PROM), an erasable PROM (EPROM), an electrically EPROM (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link (synchlink) dynamic random access memory (SLDRAM), and a direct rambus dynamic random access memory (DR RAM). It should be noted that the memory of the system and methods described in this specification includes but is not limited to these and any memory of another appropriate type.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD), a semiconductor medium (for example, a solid-state drive (e.g. a solid state disc (SSD)), or the like.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending step and the receiving step may be performed by the processing unit (the processor). For a function of a specific unit, refer to a corresponding method embodiment. There may be one or more processors.

Terminologies such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, or a computer. As illustrated by using figures, both a computing device and an application that runs on the computing device may be components. One or more components may reside within a process or a thread of execution, and a component may be located on one computer or distributed between two or more computers. In addition, these components may be executed from various computer-readable media that store various data structures. For example, the components may communicate by using a local or remote process based on a signal having one or more data packets (for example, data from two components interacting with another component in a local system, in a distributed system, or across a network such as the internet interacting with another system by using the signal).

It should be understood that, an "embodiment" mentioned throughout this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments by using any appropriate manner.

It should be understood that, in embodiments of this application, numbers "first", "second", and the like are merely used to distinguish between different objects, for example, to distinguish between different network devices, and do not constitute any limitation on the scope of embodiments of this application. Embodiments of this application are not limited thereto.

It should be further understood that, in this application, both "when" and "if" mean that a network element performs corresponding processing in an objective situation, but do not constitute any limitation on time, do not require that the network element have a determining action during implementation, and do not mean other limitations either.

It should be further understood that in embodiments of this application, "B corresponding to A" indicates that B is associated with A, and B may be determined based on A. However, it should be further understood that determining B based on A does not mean that B is determined based only on A. B may alternatively be determined based on A and/or other information.

It should also be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects.

Unless otherwise specified, an expression in this application similar to an expression that "an item includes one or more of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It may be understood that, in embodiments of this application, the session management network element and/or the terminal device may perform some or all steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application may be necessarily performed.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the units is merely logical function division or may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of embodiments.

In addition, function units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
receiving, by an access network device, a first data packet from a first terminal device, wherein the first data packet includes identification information of a second terminal device, and wherein the first terminal device and the second terminal device belong to the terminal group; and
sending, by the access network device and through a group transmission channel established between the access network device and a first routing device, the first data packet to the first routing device for forwarding,
wherein the group transmission channel is configured to transmit data packets associated with the terminal group,
wherein the first routing device corresponds to the terminal group and stores routing information of one or more respective terminal devices of the terminal group,
wherein the routing information includes routing information for forwarding the first data packet to the second terminal device via a second routing device and a second access network device.

2. The method according to claim 1, wherein the first routing device is configured in the access network device, or the first routing device is configured in a core network device; and
wherein the first routing device is connected to one or more access network devices.

3. The method according to claim 1, wherein that the first data packet is associated with the terminal group by including a group identifier of the terminal group.

4. The method according to claim 1, wherein a type of service data comprised in the first data packet is a service type corresponding to the terminal group.

5. The method according to claim 1, further comprising:
receiving, by the access network device, a service request from a third terminal device, wherein the service request indicates that the third terminal device is prepared to send, to the access network device, a data packet associated with the terminal group, and wherein the third terminal device belongs to the terminal group; and
activating, by the access network device, the group transmission channel based on the service request.

6. The method according to claim 1, wherein, before the receiving, by the access network device, the first data packet, the method further comprises:
receiving, by the access network device, a service request from a third terminal device, wherein the service request indicates that the third terminal device is prepared to send, to the access network device, a data packet associated with the terminal group, and wherein the third terminal device belongs to the terminal group; and
creating, by the access network device, the group transmission channel based on the service request.

7. The method according to claim 5, wherein the service request further comprises identification information of the third terminal device, and the method further comprising:
sending, by the access network device, a first routing information update request to the first routing device, wherein the first routing information update request requests to add routing information of the third terminal device to the first routing device.

8. The method according to claim 5, wherein the method further comprises:
deactivating, by the access network device, the group transmission channel based on the first terminal device moving out of a cell managed by the access network device and the cell managed by the access network device not comprising the terminal device belonging to the terminal group.

9. The method according to claim 6, the method further comprising:
releasing, by the access network device, the group transmission channel based on the first terminal device moving out of a cell managed by the access network device and the cell managed by the access network device not comprising the terminal device belonging to the terminal group.

10. The method according to claim 8, the method further comprising:
sending, by the access network device, a second routing information update request to the first routing device based on the first terminal device moving out of the cell managed by the access network device and the cell managed by the access network device further comprising the terminal device belonging to the terminal group, wherein the second routing information update request requests to delete routing information of the first terminal device from the first routing device.

11. A non-transitory computer readable storage medium having stored thereon instructions that, when executed by a processor, cause the processor to carry out the method according to claim 1.

12. A data transmission method, comprising:
receiving, by a first routing device via a group transmission channel established between an access network device and the first routing device, a first data packet from the access network device, wherein the first data packet includes identification information of a second terminal device, and wherein the first terminal device and the second terminal device belong to the terminal group, and wherein the group transmission channel is configured to transmit data packets associated with the terminal group; and
forwarding, by the first routing device, the first data packet to the second terminal device via a second routing device and a second access network device based on routing information of the second terminal device stored by the first routing device.

13. The method according to claim 12, wherein the routing information is obtained through synchronization by the first routing device with at least the second routing device, or the routing information is obtained by the first routing device from a routing information centralized management device, wherein the routing information centralized management device is configured to manage routing information stored in the first routing device and the second routing device.

14. A non-transitory computer readable storage medium having stored thereon instructions that, when executed by a processor, cause the processor to carry out the method according to claim 12.

15. A communication apparatus for use in an access network device, the communication apparatus comprising:
a transceiver configured to receive and send a signal; and
processing circuitry configured to perform the following operations by using the transceiver:
receiving a first data packet from a first terminal device, wherein the first data packet includes identification information of a second terminal device, and wherein the first terminal device and the second terminal device belong to the terminal group; and
sending, through a group transmission channel established between the access network device and a first routing device, the first data packet to the first routing device for forwarding,
wherein the group transmission channel is configured to transmit data packets associated with the terminal group,
wherein the first routing device corresponds to the terminal group and stores routing information of one or more respective terminal devices of the terminal group,
wherein the routing information includes routing information for forwarding the first data packet to the second terminal device via a second routing device and a second access network device.

16. The apparatus according to claim 15, wherein the first routing device is configured in the access network device, or the first routing device is configured in a core network device; and
wherein the first routing device is connected to one or more access network devices.

17. The apparatus according to claim 15, wherein that the first data packet is associated with the terminal group by including a group identifier of the terminal group.

18. The apparatus according to claim 15, wherein a type of service data comprised in the first data packet is a service type corresponding to the terminal group.

19. The apparatus according to claim 15, wherein the processing circuitry is further configured to perform, by using the transceiver:
receiving a service request from a third terminal device, wherein the service request indicates that the third terminal device is prepared to send, to the access network device, a data packet associated with the terminal group, and wherein the third terminal device belongs to the terminal group; and
the processing circuitry is further configured to activate the group transmission channel based on the service request.

20. The apparatus according to claim 15, wherein the processing circuitry is further configured to perform, by using the transceiver:
receiving a service request from a third terminal device, wherein the service request indicates that the third terminal device is prepared to send, to the access network device, a data packet associated with the terminal group, and wherein the third terminal device belongs to the terminal group; and
the processing circuitry is further configured to create the group transmission channel based on the service request.

21. The apparatus according to claim 19, wherein the service request further comprises identification information of the third terminal device, and
wherein the processing circuitry is further configured to perform, by using the transceiver:
sending a first routing information update request to the first routing device, wherein the first routing information update request requests to add routing information of the third terminal device to the first routing device.

22. The apparatus according to claim 19, wherein the processing circuitry is further configured to deactivate the group transmission channel based on the first terminal device moving out of a cell managed by the access network device and the cell managed by the access network device not comprising the terminal device belonging to the terminal group.

23. The apparatus according to claim 20, wherein the processing circuitry is further configured to release the group transmission channel based on the first terminal device moving out of a cell managed by the access network device and the cell managed by the access network device not comprising the terminal device belonging to the terminal group.

24. The apparatus according to claim 22, wherein the processing circuitry is further configured to perform, by using the transceiver:
sending a second routing information update request to the first routing device based on the first terminal device moving out of the cell managed by the access network device and the cell managed by the access network device further comprising the terminal device belonging to the terminal group, wherein the second routing information update request requests to delete routing information of the first terminal device from the first routing device.

25. A communication apparatus for use in a first routing device, the communication apparatus comprising:
a transceiver configured to receive and send a signal; and
processing circuitry configured to perform the following operations by using the transceiver:
receiving, via a group transmission channel established between an access network device and the first routing device, a first data packet from the access network device, wherein the first data packet includes identification information of a second terminal device, and wherein the first terminal device and the second terminal device belong to the terminal group, and wherein the group transmission channel is configured to transmit data packets associated with the terminal group; and
forwarding the first data packet to the second terminal device via a second routing device and a second network access device based on routing information of the second terminal device stored by the first routing device.

26. The apparatus according to claim 25, wherein the routing information is obtained through synchronization by the first routing device with at least the second routing device, or the routing information is obtained by the first routing device from a routing information centralized management device, wherein the routing information centralized management device is configured to manage routing information stored in the first routing device and second routing device.

27. A communication apparatus, comprising:
processing circuitry; and non-transitory computer readable media having stored thereon a computer program that, when executed by the processing circuitry, causes the apparatus to perform the method according to claim 1.

28. A communication apparatus, comprising:
processing circuitry; and
an interface circuit configured to receive code instructions and transmit the code instructions to the processing circuitry; and
wherein the processing circuitry is configured to run the code instructions to perform the method according to claim 1.

* * * * *